US009262119B2

(12) United States Patent
Araki

(10) Patent No.: US 9,262,119 B2
(45) **Date of Patent: *Feb. 16, 2016**

(54) RECORDING/TRANSFERRING PROGRAM, RECORDING/TRANSFERRING APPARATUS, AND RECORDING/TRANSFERRING METHOD

(71) Applicant: Sony Corporation, Tokyo (JP)

(72) Inventor: Satoshi Araki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 14/520,869

(22) Filed: Oct. 22, 2014

(65) Prior Publication Data

US 2015/0039111 A1 Feb. 5, 2015

Related U.S. Application Data

(63) Continuation of application No. 11/619,778, filed on Jan. 4, 2007, now Pat. No. 8,925,029.

(30) Foreign Application Priority Data

Jan. 11, 2006 (JP) ................................ 2006-003801
Nov. 29, 2006 (JP) ................................ 2006-322092

(51) Int. Cl.
*H04N 7/173* (2011.01)
*G06F 3/16* (2006.01)
(Continued)

(52) U.S. Cl.
CPC .......... *G06F 3/162* (2013.01); *G06F 17/30752* (2013.01); *G11B 19/02* (2013.01); *G11B 27/034* (2013.01); *G11B 27/105* (2013.01); *G11B 7/28* (2013.01)

(58) Field of Classification Search
CPC .......... H04N 7/17318; H04N 21/4126; H04N 5/44543
USPC .................. 725/86-116, 131-134, 139-142; 709/217-232
See application file for complete search history.

(56) References Cited

U.S. PATENT DOCUMENTS 5,109,414 A * 4/1992 Harvey et al. ................. 725/135
6,516,339 B1 * 2/2003 Potts, Jr. ................. H04L 67/06 709/203

(Continued)

FOREIGN PATENT DOCUMENTS

JP 10-187563 7/1998
JP 2000-90580 3/2000

(Continued)

OTHER PUBLICATIONS

Office Action issued Apr. 19, 2011 in Japanese Patent Application No. 2006-322092.

*Primary Examiner* — Annan Shang
(74) *Attorney, Agent, or Firm* — Oblon, McClelland, Maier & Neustadt, L.L.P.

(57) ABSTRACT

Disclosed herein is a recording/transferring program that causes an information processing apparatus to perform the steps of: generating programming information for programming the information processing apparatus to record a particular content; starting recording of the particular content onto a recording medium in accordance with the programming information; and automatically transferring, upon completion of the recording of the particular content onto the recording medium, the particular content read out from the recording medium to an external device connected to the information processing apparatus so as to be capable of communicating therewith.

15 Claims, 11 Drawing Sheets

(51) Int. Cl.

| | |
|---|---|
| ***G11B 19/02*** | (2006.01) |
| ***G11B 27/034*** | (2006.01) |
| ***G11B 27/10*** | (2006.01) |
| ***G06F 17/30*** | (2006.01) |
| *G11B 7/28* | (2006.01) |

(56) References Cited

U.S. PATENT DOCUMENTS 6,732,369 B1 * 5/2004 Leftwich et al. ................ 725/39
7,558,837 B1 * 7/2009 Denny .................. G06F 15/173 709/217
8,874,244 B2 * 10/2014 Rhoads .................. G06Q 30/00 380/237
2002/0048450 A1 * 4/2002 Zetts .................... G11B 27/002 386/329
2002/0174442 A1 11/2002 Nomura
2003/0115069 A1 * 6/2003 Pence ..................... G06F 21/10 705/51
2003/0198462 A1 * 10/2003 Bumgardner et al. .......... 386/83
2003/0204858 A1 * 10/2003 Nakamura .................... 725/151
2003/0229681 A1 * 12/2003 Levitan .................. H04H 20/86 709/218
2004/0061773 A1 * 4/2004 Liu ........................ H04N 7/148 348/14.02
2004/0154040 A1 * 8/2004 Ellis ................................ 725/58
2004/0205150 A1 10/2004 Shibasaki
2005/0019011 A1 1/2005 Takeda
2005/0104730 A1 * 5/2005 Yang .................... A47G 29/141 340/569
2005/0213448 A1 9/2005 Takahashi
2005/0265169 A1 12/2005 Yoshimaru et al.
2006/0031784 A1 2/2006 Makela
2006/0126649 A1 * 6/2006 Akiyoshi ................ H04L 29/06 370/401
2006/0156343 A1 * 7/2006 Jordan ............................ 725/50
2006/0174279 A1 * 8/2006 Sullivan et al. ................. 725/58
2006/0280437 A1 12/2006 Logan et al.
2006/0282869 A1 12/2006 Plourde, Jr.
2007/0168539 A1 7/2007 Day

FOREIGN PATENT DOCUMENTS

JP 2001-202086 7/2001
JP 2005-108385 4/2005
JP 2006-4332 1/2006

* cited by examiner 10
11
12
13
14
15
16
16

PORTABLE PLAYER
14
RECORDING/ REPRODUCING APPARATUS
13
11
11A
11B
URL
URL
SP20
ACQUISITION REQUEST
SP100
UPLOAD
SP110
UPLOAD
SP101
START DOWNLOAD (TRANSMISSION)
SP21
START DOWNLOAD (RECEPTION)
SP22
DOWNLOAD HAS BEEN COMPLETED?
NO
YES
SP23
DOWNLOAD OF ALL PIECES OF UPLOADED AUDIO DATA HAS BEEN COMPLETED?
NO
YES
A
B
C
D
E

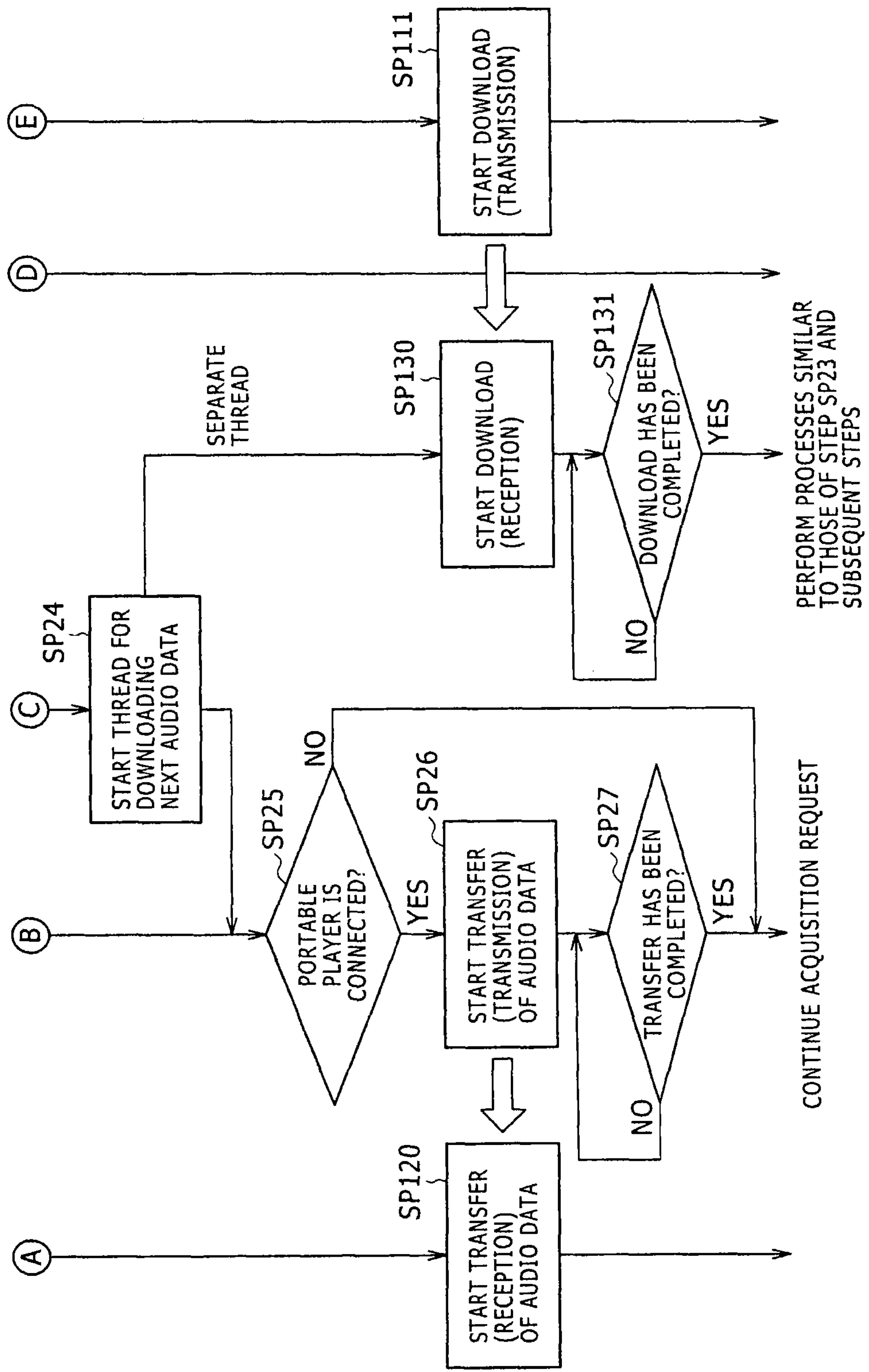
FIG. 9
A
B
C
D
E
SP24
START THREAD FOR DOWNLOADING NEXT AUDIO DATA
SEPARATE THREAD
SP111
START DOWNLOAD (TRANSMISSION)
SP130
START DOWNLOAD (RECEPTION)
SP131
DOWNLOAD HAS BEEN COMPLETED?
YES
NO
PERFORM PROCESSES SIMILAR TO THOSE OF STEP SP23 AND SUBSEQUENT STEPS
SP25
PORTABLE PLAYER IS CONNECTED?
YES
NO
SP26
START TRANSFER (TRANSMISSION) OF AUDIO DATA
SP27
TRANSFER HAS BEEN COMPLETED?
YES
NO
CONTINUE ACQUISITION REQUEST
SP120
START TRANSFER (RECEPTION) OF AUDIO DATA RT4
START
SP400
SP401
INPUT AUDIO RECORDING START TIME HAS COME?
NO
YES
SP402
START RECORDING
SP403
RECORDING HAS BEEN COMPLETED?
NO
YES
SP404
INPUT AUDIO RECORDING END TIME HAS COME?
NO
SP405
START THREAD FOR RECORDING NEXT AUDIO DATA
YES
SP406
PORTABLE PLAYER IS CONNECTED?
NO
YES
SP407
START TRANSFER OF AUDIO DATA
SP408
TRANSFER HAS BEEN COMPLETED?
NO
YES
END
SP409

RECORDING/TRANSFERRING PROGRAM, RECORDING/TRANSFERRING APPARATUS, AND RECORDING/TRANSFERRING METHOD

CROSS REFERENCES TO RELATED APPLICATIONS

This application is a continuation of U.S. application Ser. No. 11/619,778 filed Jan. 4, 2007, which claims priority to Japanese Patent Application JP 2006-003801, filed Jan. 11, 2006, and Japanese Patent Application JP 2006-322092, filed Nov. 29, 2006, the entire contents of each of which are incorporated herein by reference.

BACKGROUND OF THE INVENTION

1. Field of the Invention

The present invention relates to a recording/transferring program, a recording/transferring apparatus, and a recording/transferring method, which can be suitably used when recording a content and transferring the recorded content, for example.

2. Description of the Related Art

As a recording/transferring apparatus for recording and transferring a content, there is already a recording/reproducing apparatus that records audio data on a hard disk drive and reproduces the recorded audio data. This recording/reproducing apparatus is capable of reading audio data as a content from a compact disc (CD) and recording the read audio data on the hard disk drive (this process is also referred to as "ripping") and, thereafter, reproducing the ripped audio data or transferring the ripped audio data to an external portable player connected thereto.

When a user desires the recording/reproducing apparatus to perform a process of ripping the audio data and transferring the ripped audio data to the portable player, the user first performs on the recording/reproducing apparatus an operation of issuing an instruction to rip the audio data (hereinafter, this operation will also be referred to as a "ripping operation"). As a result, the recording/reproducing apparatus starts ripping the audio data. Then, after recognizing that the ripping of the audio data has been completed in the recording/reproducing apparatus, the user next performs on the recording/reproducing apparatus an operation of issuing an instruction to transfer the ripped audio data to the portable player (hereinafter, this operation will also be referred to as a "transferring operation"). As a result, the recording/reproducing apparatus transfers the ripped audio data to the external portable player connected thereto.

Many users rip the audio data using the recording/reproducing apparatus in order to listen to music with the portable player. Accordingly, there has been recently proposed a method of, upon completion of the ripping of the audio data, automatically transferring the ripped audio data to the portable player, thereby eliminating the need for the user to perform the transferring operation. According to this method, since the transferring operation is omitted and thus the user operation is made simpler, a process between the ripping of the audio data and the transfer thereof is achieved more quickly (see Japanese Patent Laid-open No. 2001-202086, for example).

SUMMARY OF THE INVENTION

The above-described method, however, does not eliminate the need for the user to perform the ripping operation. That is, when the user desires the recording/reproducing apparatus to start the ripping of the audio data, the user has to perform the ripping operation on the recording/reproducing apparatus at the time when the user desires to start the ripping. In other words, the user can cause the recording/reproducing apparatus to start the ripping only when he or she is able to operate the recording/reproducing apparatus.

If the ripping operation to be performed when the user desires to start the ripping can be omitted, the ripping and transfer of the audio data can all be performed automatically. This will result in a considerably greater degree of convenience.

As such, an advantage of the present invention is to provide a recording/transferring program, a recording/transferring apparatus, and a recording/transferring method which achieve a considerably greater degree of convenience when recording and transferring a content.

According to one embodiment of the present invention, there is provided a recording/transferring program. The program causes an information processing apparatus to perform the steps of: generating programming information for programming the information processing apparatus to record a particular content; starting recording of the particular content onto a recording medium in accordance with the programming information; and automatically transferring, upon completion of the recording of the particular content onto the recording medium, the particular content read out from the recording medium to an external device connected to the information processing apparatus so as to be capable of communicating therewith.

According to another embodiment of the present invention, there is provided a recording/transferring apparatus including: a programming information generation section configured to generate programming information for programming the recording/transferring apparatus to record a particular content; and a recording start section configured to start recording of the particular content onto a recording medium in accordance with the programming information generated by the programming information generation section. The apparatus further includes a transfer section configured to, upon completion of the recording of the particular content onto the recording medium started by the recording start section, automatically transfer the particular content read from the recording medium to an external device connected to the recording/transferring apparatus so as to be capable of communicating therewith.

According to yet another embodiment of the present invention, there is provided a recording/transferring method including the steps of: generating programming information for programming an information processing apparatus to record a particular content; and starting recording of the particular content onto a recording medium in accordance with the programming information. The method further includes a step of automatically transferring, upon completion of the recording of the particular content onto the recording medium, the particular content read out from the recording medium to an external device connected to the information processing apparatus so as to be capable of communicating therewith.

According to the above-described embodiments of the present invention, if only the programming information is generated in advance, the recording of a content can be started automatically, and then, the recorded content can be transferred to the external device automatically. This makes it possible to perform the process of recording and transferring the content automatically from start to finish, without the need for the user operation that has been required, when starting the recording of the content. Thus, the convenience with which the recording and transfer of a content is performed is greatly improved.

BRIEF DESCRIPTION OF THE DRAWINGS

FIG. 9 is a sequence chart that follows the sequence chart of FIG. 8, illustrating the automatic recording/transferring procedure according to the second embodiment;

DETAILED DESCRIPTION OF THE PREFERRED EMBODIMENTS

Hereinafter, embodiments of the present invention will be described in detail with reference to the accompanying drawings.

1. First Embodiment 1-1. Outline

An outline of a first embodiment of the present invention will now be described below with reference to FIG. 1. The first embodiment will be described specifically after the description of the outline.

Figure 1:
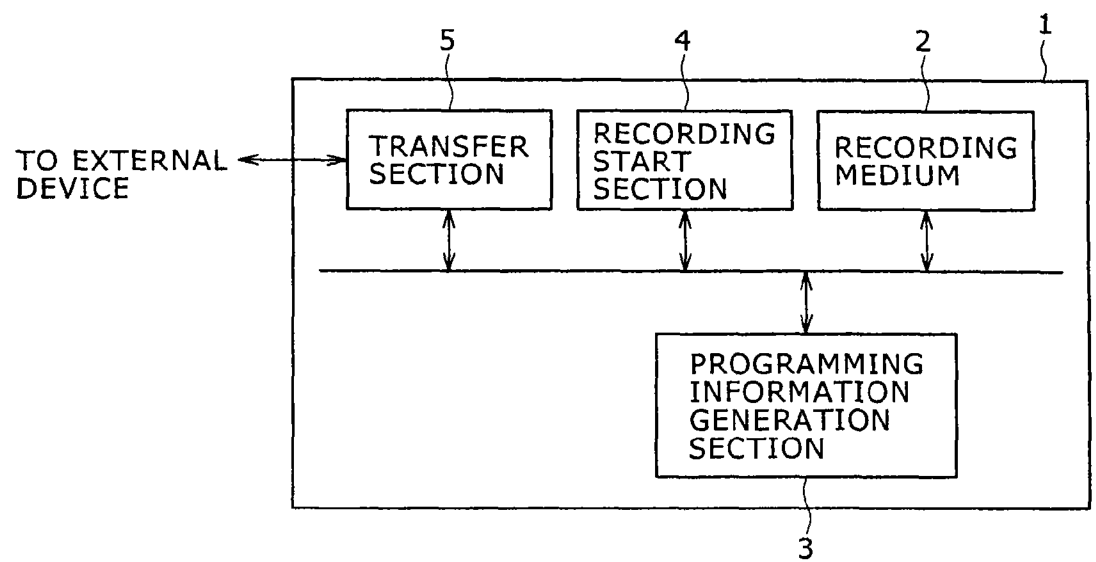
FIG. 1 is a block diagram illustrating an outline of a recording/transferring apparatus.

A recording/transferring apparatus 1 as illustrated in FIG. 1 includes: a recording medium 2 for recording a content; a programming information generation section 3 for generating programming information for programming the recording/transferring apparatus 1 to record a particular content; a recording start section 4 for starting recording of the particular content onto the recording medium 2 in accordance with the programming information; and a transfer section 5 for, upon completion of the recording of the particular content onto the recording medium 2, automatically transferring the particular content read from the recording medium 2 to an external device that is connected to the recording/transferring apparatus 1 so as to be capable of communicating therewith.

Having the above structure, the recording/transferring apparatus 1 is capable of automatically starting the recording of the content and automatically transferring the recorded content to the external device if the programming information has been generated in advance. Thus, processing can be wholly performed automatically from the start of the recording of the content to the transfer of the recorded content without the need for a user operation that is required, in related art, at the time of starting the recording of the content.

1-2. Structure of recording/transferring system

Next, a recording/transferring system, which is a specific example to which the above-described recording/transferring apparatus 1 is applied, will now be described below with reference to FIG. 2.

Figure 2:
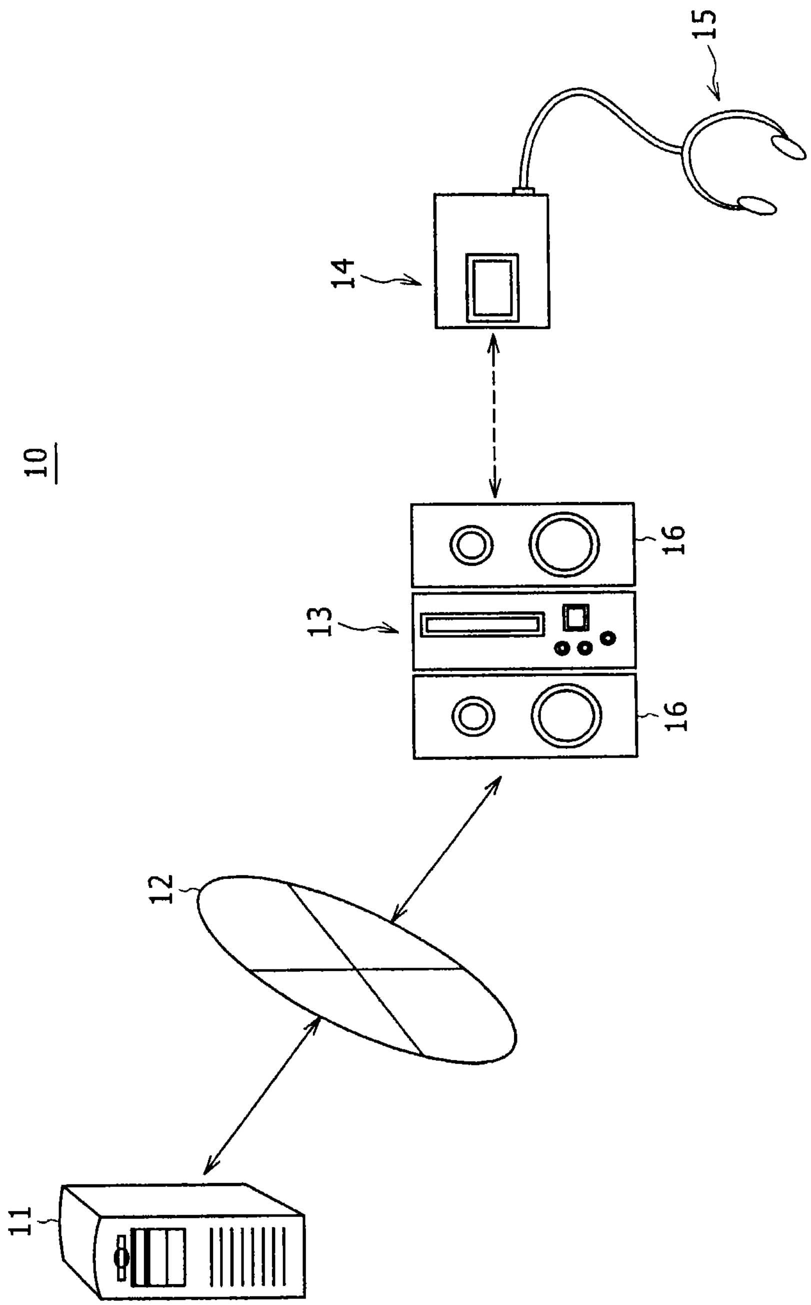
FIG. 2 is an illustration of a configuration of a recording/transferring system.

FIG. 2 shows a recording/transferring system 10. In FIG. 2, a recording/reproducing apparatus 13 receives audio data delivered from a music distribution server 11 that stores and manages audio data (i.e., contents) via a network 12, and records the received audio data on a hard disk drive (not shown). In other words, the recording/reproducing apparatus 13 downloads the audio data from the music distribution server 11 via the network 12. Further, the recording/reproducing apparatus 13 transfers the audio data recorded on the hard disk drive to a portable player 14 that is connected thereto so as to be capable of communicating therewith. Then, if a user performs a playback operation on the portable player 14 detached from the recording/reproducing apparatus 13, for example, the portable player 14 reproduces the transferred audio data to output a sound based on the audio data via an earphone 15 connected to the portable player 14. The recording/reproducing apparatus 13 is also capable of reproducing the recorded audio data to output the sound based on the audio data via a loudspeaker 16 connected thereto. Note that the recording/reproducing apparatus 13 corresponds to the above-described recording/transferring apparatus 1.

Figure 3:
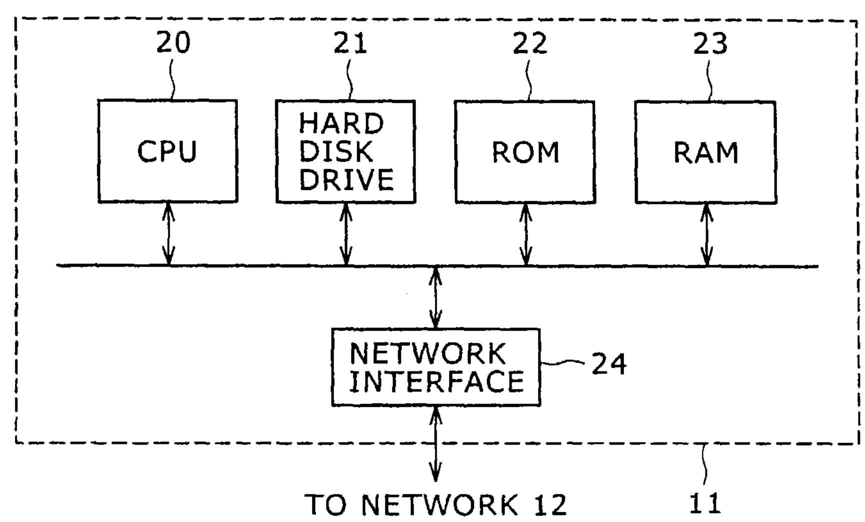
FIG. 3 is a block diagram illustrating a structure of a music distribution server.

1-3. Structures of music distribution server, Recording/Reproducing Apparatus, and Portable Player Structures of the music distribution server 11, the recording/reproducing apparatus 13, and the portable player 14 will now be described below. First, the structure of the music distribution server 11 will be described below with reference to FIG. 3. As illustrated in FIG. 3, the music distribution server 11 includes a central processing unit (CPU) 20, a hard disk drive 21, a read only memory (ROM) 22, a random access memory (RAM) 23, and a network interface 24. In the music distribution server 11, the CPU 20 exercises centralized control over the whole of the music distribution server 11 in accordance with a program read from the hard disk drive 21 or the ROM 22, and executes various processes. Data and a program used in the various processes are stored in the RAM 23 as necessary.

In practice, if an acquisition request for requesting acquisition of audio data is received from the recording/reproducing apparatus 13 on the network 12 via the network interface 24, for example, the CPU 20 of the music distribution server 11 reads the audio data indicated by the acquisition request from the hard disk drive 21, and transmits the read audio data to the recording/reproducing apparatus 13 on the network 12 via the network interface 24. Thus, the music distribution server 11 is capable of delivering the audio data to the recording/reproducing apparatus 13 in accordance with the acquisition request from the recording/reproducing apparatus 13.

Figure 4:
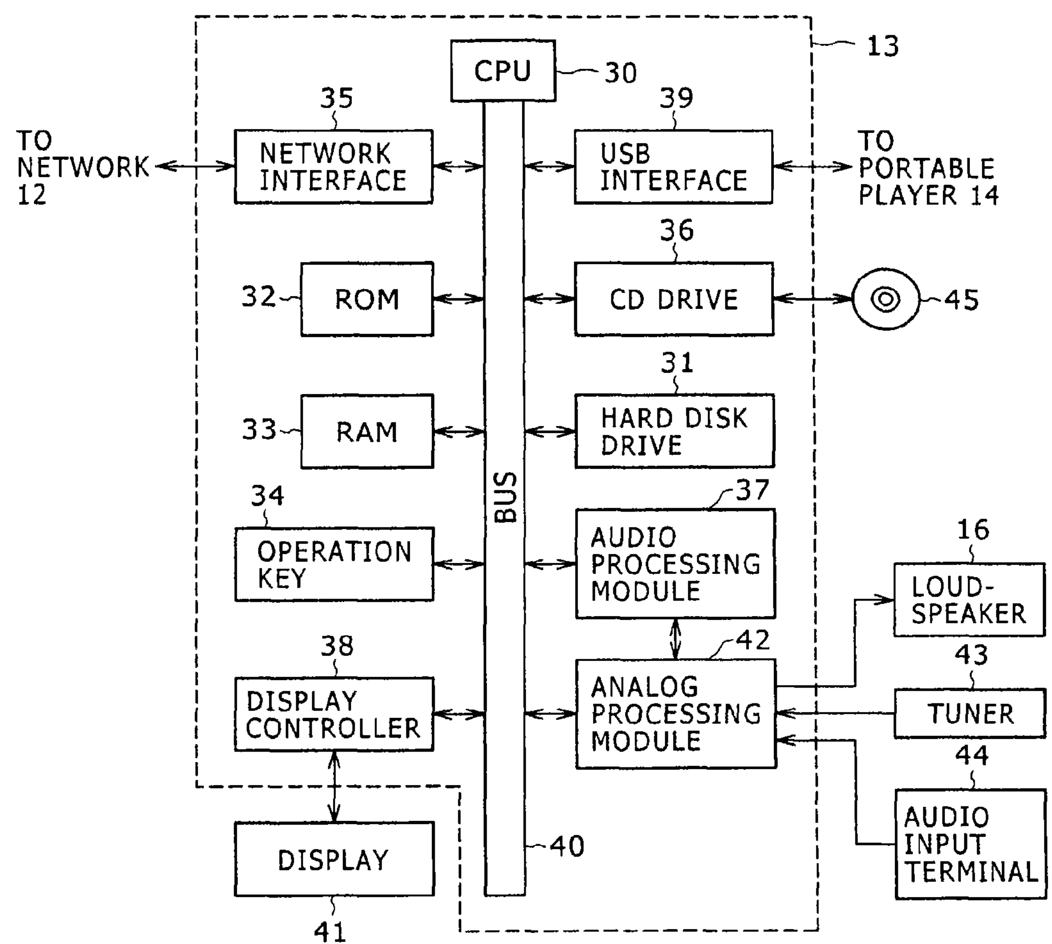
FIG. 4 is a block diagram illustrating a structure of a recording/reproducing apparatus.

Next, the structure of the recording/reproducing apparatus 13 will now be described below with reference to FIG. 4. As illustrated in FIG. 4, in the recording/reproducing apparatus 13, a CPU 30, a hard disk drive 31, a ROM 32, a RAM 33, an operation key 34, a network interface 35, a CD drive 36, an audio processing module 37, a display controller 38, and a universal serial bus (USB) interface 39 are connected to one another via a bus 40. Further, a display 41 is connected to the display controller 38, while the loudspeaker 16, a tuner 43, and an audio input terminal 44 are connected to the audio processing module 37 via an analog processing circuit 42.

Note that the display 41, the loudspeaker 16, and the tuner 43 may either be integral parts of the recording/reproducing apparatus 13 or separate, external devices connected to the recording/reproducing apparatus 13.

In the recording/reproducing apparatus 13, the CPU 30 exercises centralized control over the whole of the recording/reproducing apparatus 13 in accordance with a program read from the hard disk drive 31 or the ROM 32, and executes various processes. Data and a program used in the various processes are stored in the RAM 33 as necessary.

In practice, if the CPU 30 of the recording/reproducing apparatus 13 having the above-described structure detects that the user has performed, via the operation key 34, an operation of issuing an instruction to download the audio data from the music distribution server 11 on the network 12 (hereinafter, this operation will also be referred to as a "download operation"), the CPU 30, in response to the detection, transmits the acquisition request for the audio data to the music distribution server 11 on the network 12 via the network interface 35. Then, the CPU 30 receives the audio data transmitted from the music distribution server 11 in accordance with the acquisition request via the network interface 35, and records the received audio data on the hard disk drive 31.

In addition, if the CPU 30 detects that the user has performed, via the operation key 34, an operation (i.e., a ripping operation) of issuing an instruction to rip audio data recorded on a CD 45 mounted on the CD drive 36, the CPU 30, in response to the detection, reads the audio data from the CD 45 and records the read audio data on the hard disk drive 31. At this time, the CPU 30 is not only capable of recording the audio data read from the CD 45 as it is on the hard disk drive 31 but also capable of supplying the read audio data to the audio processing module 37 to encode and compress it and thereafter recording the encoded and compressed audio data on the hard disk drive 31. In this case, the audio processing module 37 encodes and compresses the audio data according to a format such as an MPEG Audio Layer-3 (MP3) format, an Adaptive Transform Acoustic Coding 3 (ATRAC3 (registered trademark)) format, or the like.

In addition, if the CPU 30 detects that the user has performed, via the operation key 34, an operation of issuing an instruction to record a broadcast signal received by the tuner 43 (hereinafter, this operation will also be referred to as a "broadcast recording operation"), the CPU 30, in response to the detection, subjects the broadcast signal received by the tuner 43 to an analog process, such as analog to digital conversion, in the analog processing circuit 42 and then subjects it to a digital process, such as encoding and compressing, in the audio processing module 37, to obtain audio data based on the broadcast signal, and records the obtained audio data on the hard disk drive 31.

In addition, if the CPU 30 detects that the user has performed, via the operation key 34, an operation of issuing an instruction to record an audio signal inputted from the audio input terminal 44 (hereinafter, this operation will also be referred to as an "input audio recording operation"), the CPU 30, in response to the detection, subjects the audio signal inputted from the audio input terminal 44 to the analog process, such as the analog to digital conversion, in the analog processing circuit 42 and thereafter subjects it to the digital process, such as the encoding and compressing, in the audio processing module 37, to obtain audio data based on the audio signal, and records the obtained audio data on the hard disk drive 31.

In the above-described manners, the recording/reproducing apparatus 13 is capable of recording, on the hard disk drive 31, the audio data acquired from various sources, such as the music distribution server 11, the CD 45, the tuner 43, the audio input terminal 44, and so on.

In addition, if the CPU 30 of the recording/reproducing apparatus 13 detects that the user has performed, via the operation key 34, an operation of issuing an instruction to reproduce the audio data recorded on the hard disk drive 31, the CPU 30, in response to the detection, reads the audio data from the hard disk drive 31 and supplies the read audio data to the audio processing module 37. Under control of the CPU 30, the audio processing module 37 subjects the audio data to a digital process, such as decoding, and thereafter, the analog processing circuit 42 subjects it to an analog process, such as digital to analog conversion, to obtain an audio signal. Then, a sound based on the obtained audio signal is outputted via the loudspeaker 16.

In addition, if the CPU 30 detects that the user has performed, via the operation key 34, an operation of issuing an instruction to reproduce the audio data recorded on the CD 45, the CPU 30, in response to the detection, reads the audio data from the CD 45 and supplies the read audio data to the audio processing module 37. Under control of the CPU 30, the audio processing module 37 subjects the audio data to the digital process, such as decoding, and thereafter, the analog processing circuit 42 subjects it to the analog process, such as digital to analog conversion, to obtain an audio signal. Then, a sound based on the obtained audio signal is outputted via the loudspeaker 16.

In addition, if the CPU 30 detects that the user has performed, via the operation key 34, an operation of issuing an instruction to reproduce the broadcast signal received by the tuner 43, the CPU 30, in response to the detection, subjects the broadcast signal received by the tuner 43 to the analog process, such as analog to digital conversion, in the analog processing circuit 42, and thereafter, subjects it to the digital process, such as equalizing, in the audio processing module 37 to obtain audio data based on the broadcast signal. Then, the CPU 30 subjects the obtained audio data to the analog process, such as digital to analog conversion, in the analog processing circuit 42 to obtain an audio signal based on the broadcast signal, and outputs a sound based on the obtained audio signal via the loudspeaker 16.

In addition, if the CPU 30 detects that the user has performed, via the operation key 34, an operation of issuing an instruction to reproduce the audio signal inputted from the audio input terminal 44, the CPU 30, in response to the detection, subjects the audio signal inputted from the audio input terminal 44 to the analog process, such as analog to digital conversion, in the analog processing circuit 42, and thereafter, subjects it to the digital process, such as equalizing, in the audio processing module 37 to obtain audio data based on the audio signal. Then, the CPU 30 subjects the obtained audio data to the analog process, such as digital to analog conversion, in the analog processing circuit 42 to obtain an audio signal again, and outputs a sound based on the obtained audio signal via the loudspeaker 16.

In the above-described manners, the recording/reproducing apparatus 13 is capable of reproducing the audio data acquired from various sources such as the hard disk drive 31, the CD 45, the tuner 43, the audio input terminal 44, and so on.

In addition, if the CPU 30 of the recording/reproducing apparatus 13 detects that the user has performed, via the operation key 34, an operation (i.e., a transferring operation) of issuing an instruction to transfer the audio data recorded on the hard disk drive 31 to the portable player 14 connected to the recording/reproducing apparatus 13 via the USB interface, the CPU 30, in response to the detection, reads the audio data from the hard disk drive 31 and transfers the read audio data to the portable player 14 via the USB interface 39.

In the above-described manner, the recording/reproducing apparatus 13 is capable of transferring the audio data recorded on the hard disk drive 31 to the portable player 14 connected thereto so as to be capable of communicating therewith. Note that the recording/reproducing apparatus 13 is capable of supplying power to the portable player 13 via the USB interface 39 in addition to transferring the audio data thereto.

In addition, the CPU 30 is capable of displaying a graphical user interface (GUI) screen concerning the recording, reproducing, or transferring of the audio data on the display 41 via the display controller 38. Note that in the GUI screen is also displayed related information (e.g., a title of a musical piece based on the audio data, an artist name, a playing time, etc.) added to the audio data.

Figure 5:
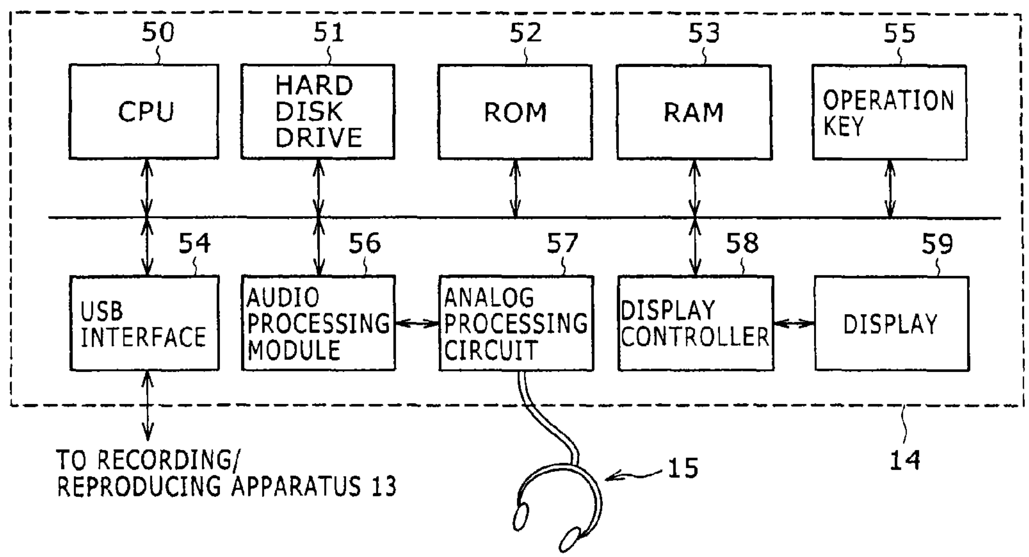
FIG. 5 is a block diagram illustrating a structure of a portable player.

Next, the structure of the portable player 14 will now be described below with reference to FIG. 5. In the portable player 14, a CPU 50 exercises centralized control over the whole of the portable player 14 in accordance with a program read out from a hard disk drive 51 or a ROM 52, and executes various processes. Data and a program used in the various processes are stored in a RAM 53 as necessary. In addition, the portable player 14 is capable of charging a secondary battery (not shown) with the power supplied from the recording/reproducing apparatus 13 via a USB interface 54. Further, the portable player 14 is capable of recording the audio data transferred from the recording/reproducing apparatus 13 via the USB interface 54 on the hard disk drive 51.

In practice, if the CPU 50 of the portable player 14 detects that the user has performed, via an operation key 55, an operation to issue an instruction to reproduce the audio data recorded on the hard disk drive 51 when the portable player 14 is not connected to the recording/reproducing apparatus 13, the CPU 50, in response to the detection, reads out the audio data from the hard disk drive 51 and supplies the read audio data to an audio processing module 56. Under control of the CPU 50, the audio processing module 56 subjects the supplied audio data to a digital process, such as decoding, and thereafter, an analog processing circuit 57 subjects it to an analog process, such as digital to analog conversion, to obtain an audio signal. Then, a sound based on the obtained audio signal is outputted via the earphone 15.

The portable player 14 is capable of recording the audio data transferred from the recording/reproducing apparatus 13 on the hard disk drive 51 and reproducing the recorded audio data in the above-described manners.

In addition, the CPU 50 is also capable of displaying the related information (e.g., the title of the musical piece based on the audio data, the artist name, the playing time, etc.) added to the audio data recorded on the hard disk drive 51 on a display 59 via a display controller 58.

1-4. Automatic recording/transferring function

The recording/transferring system 10 implements not only a manual recording/transferring function but also an automatic recording/transferring function. The manual recording/transferring function refers to a function of, when the CPU 30 of the recording/reproducing apparatus 13 has detected the download operation performed by the user, downloading the audio data (i.e., acquiring the audio data from the music distribution server 11 and recording the acquired audio data on the hard disk drive 31) and, when the CPU 30 has detected the transferring operation performed by the user, transferring the recorded audio data to the portable player 14, for example. The automatic recording/transferring function refers to a function of, under control of the CPU 30, automatically downloading the audio data at a previously set time and then automatically transferring the downloaded audio data to the portable player 14, for example. The automatic recording/transferring function will now be described below.

First, if the CPU 30 of the recording/reproducing apparatus 13 detects that the user has set, via the operation key 34, a time at which download of particular audio data from the music distribution server 11 should be started (hereinafter, this time will also be referred to as a "download start time"), the CPU 30, in response to the detection, generates the programming information including identification information for identifying the particular audio data and the download start time. The programming information is used for programming the recording/reproducing apparatus 13 to start the download of the particular audio data at the set download start time. Note that the particular audio data now in question is audio data specified by the user. The identification information may be any information as long as it is capable of identifying the particular audio data. Examples of the identification information include content identification information capable of identifying the particular audio data and a URL that is a network address of the particular audio data. Further, the identification information may be any information as long as it enables the music distribution server 11 to identify the particular audio data, and therefore, the identification information may be a search key for searching for the particular audio data. In this case, examples of the identification information include a music title, an album title, an artist name, and a name of a composer corresponding to the particular audio data.

Thereafter, when the CPU 30 detects that a current time obtained from a timer circuit (not shown) has reached the download start time indicated in the programming information, i.e., when the download start time set by the user has come, the CPU 30 starts the download of the particular audio data identified by the identification information from the music distribution server 11.

Then, upon completion of the download of the particular audio data, the CPU 30 reads out the downloaded audio data from the hard disk drive 31 and transfers the read audio data to the portable player 14 connected to the recording/reproducing apparatus 13 via the USB interface 39.

As described above, if only the user sets the download start time for the particular audio data, the recording/reproducing apparatus 13, having the above-described automatic recording/transferring function, automatically starts the download of the audio data when the download start time has come, and then automatically transfers the downloaded audio data to the portable player 14. Therefore, the download operation and the transferring operation, which need to be performed in the case of the manual recording/transferring function, can be omitted, but nevertheless, the download and transfer of the audio data can be performed, automatically, at an arbitrary time.

Figure 6A:
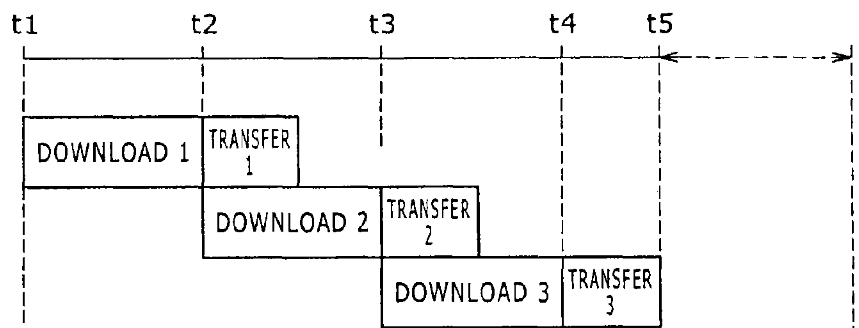
FIGS. 6A and 6B are diagrams illustrating how download and transfer are performed in parallel.

Further, according to the automatic recording/transferring function, in the case where a plurality of pieces of audio data are to be downloaded (i.e., in the case where the user has specified a plurality of pieces of audio data to be downloaded, or in the case where a plurality of pieces of identification information for identifying the plurality of pieces of audio data are set in the programming information), the transfer of a piece of audio data already downloaded and the download of the next piece of audio data are performed in parallel (i.e., simultaneously). This parallel processing will now be described below with reference to FIG. 6A. Note that the following description is made with reference to an exemplary case where three pieces of audio data are downloaded. For ease of explanation, it is also assumed that one piece of audio data corresponds to one content (e.g., one musical piece) and that each piece of audio data has the same data size.

When a download start time t1 has come, the CPU 30 of the recording/reproducing apparatus 13 starts downloading a first of the three pieces of audio data specified by the user from the music distribution server 11. Then, at a time t2, when the download of the first piece of audio data is completed, the CPU 30 starts transferring the first piece of audio data to the portable player 14 and also starts downloading a second piece of audio data.

That is, after the time t2, the CPU 30 performs the transfer of the first piece of audio data and the download of the second piece of audio data in parallel (i.e., simultaneously). Of the transfer of the audio data via the USB interface 39 and the download of the audio data via the network interface 35, the transfer of the audio data via the USB interface 39 is generally the faster, because, between the recording/reproducing apparatus 13 and the portable player 14, the data is exchanged directly, without the network 12 or the like intermediating therebetween.

Therefore, the transfer of the first piece of audio data and the download of the second piece of audio data are performed in parallel from the time t2 until the completion of the transfer of the first piece of audio data, and the download of the second piece of audio data is completed at a time t3, i.e., some time after the transfer of the first piece of audio data is completed. Further, at the time t3, when the download of the second piece of audio data is completed, the CPU 30 starts the transfer of the second piece of audio data to the portable player 14 and also starts the download of a third piece of audio data.

Then, the transfer of the second piece of audio data and the download of the third piece of audio data are performed in parallel by the CPU 30 from the time t3 until the completion of the transfer of the second piece of audio data, and the download of the third piece of audio data is completed at time t4, i.e., some time after the transfer of the second piece of audio data is completed. Then, at the time t4, when the download of the third piece of audio data is completed, the CPU 30 starts the transfer of the third piece of audio data to the portable player 14. Then, the transfer of the third piece of audio data to the portable player 14 is completed at t5, i.e., some time after the time t4.

Figure 6B:
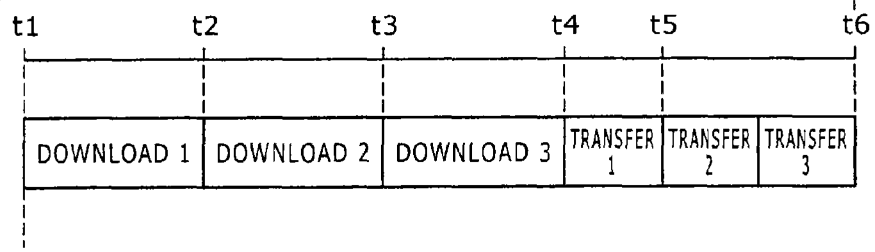

As described above, in the case where a plurality of pieces of audio data are downloaded, the recording/reproducing apparatus 13 performs the transfer of a piece of audio data already downloaded and the download of the next piece of audio data in parallel. Therefore, as compared with a sequential processing, as illustrated in FIG. 6B, in which the three pieces of audio data are downloaded one after another and thereafter the three pieces of audio data are transferred to the portable player 14 one after another, the processing time from the start of the download to the end of the transfer of the audio data can be reduced by a length of time corresponding to a total time during which the transfer and download of the audio data are performed in parallel (i.e., by a length of time between the time t5 and a time t6 as illustrated in FIG. 6B).

1-5. Automatic recording/transferring procedure

Next, a procedure for the above-described automatic recording and transfer will now be described below with reference to a flowchart of FIG. 7. Note that this automatic recording/transferring procedure is a process flow (hereinafter also referred to as a "thread") performed by the CPU 30 of the recording/reproducing apparatus 13 in accordance with the program read out from the hard disk drive 31 or the ROM 32.

Figure 7:
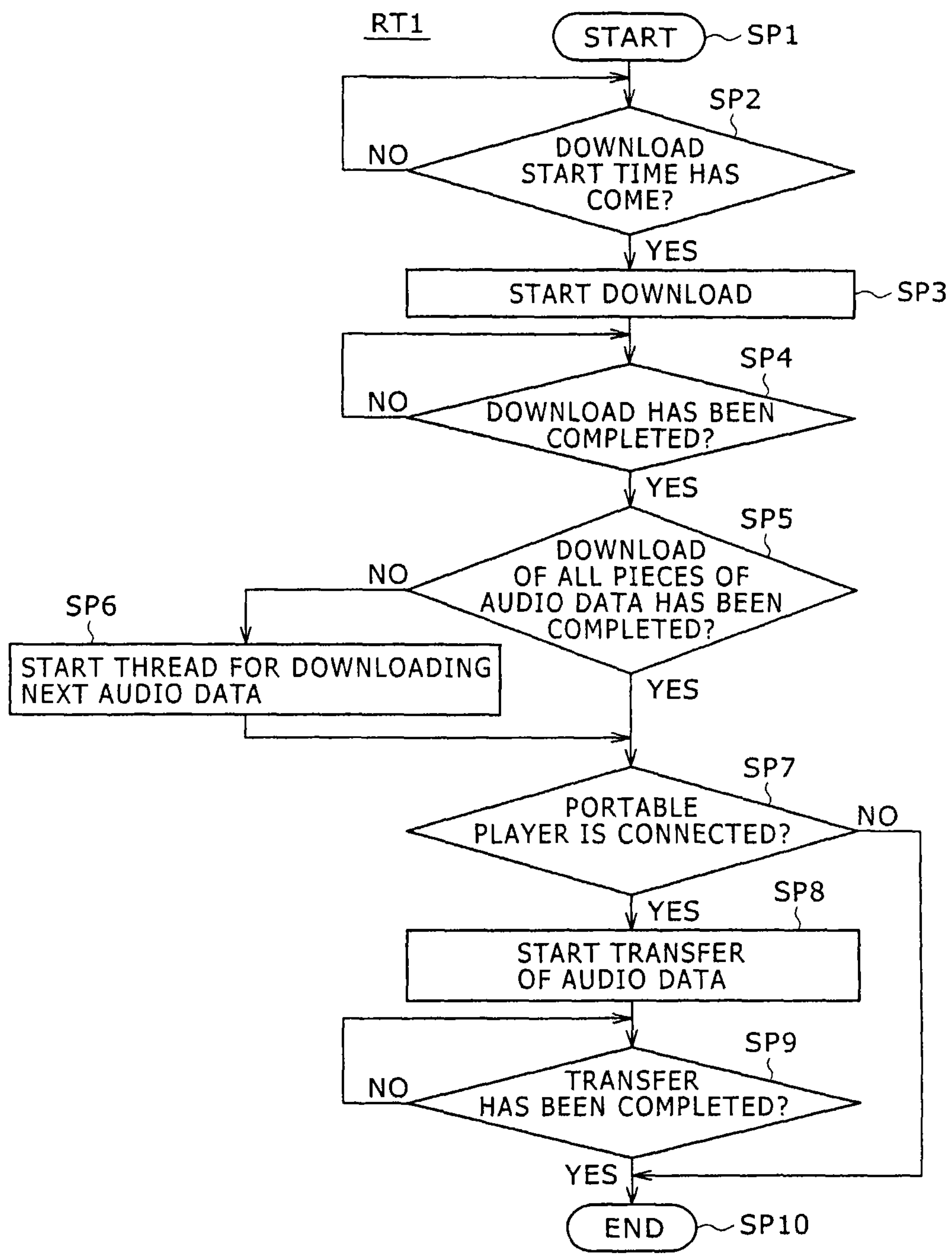
FIG. 7 is a flowchart illustrating an automatic recording/transferring procedure according to a first embodiment of the present invention.

Referring to FIG. 7, when the download start time for the particular audio data is set by the user, the CPU 30 of the recording/reproducing apparatus 13 generates the programming information including the identification information for identifying the particular audio data and the download start time, and starts an automatic recording/transferring procedure RT1 with step SP1. Then, the CPU 30 proceeds to the next step SP2. At step SP2, based on the current time obtained from the timer circuit (not shown), the CPU 30 waits until the download start time indicated in the programming information comes and, when the download start time has come, proceeds to the next step SP3.

At step SP3, in the case where a first of a plurality of pieces of identification information indicated in the programming information is a URL, the CPU 30 accesses the URL. It is assumed here that the URL is an URL that is a network address within the music distribution server 11. On the other hand, in the case where the identification information is the content identification information for identifying the content or the search key, the identification information is, under control of the CPU 30, transferred to the music distribution server 11 via the network interface 35. Then, the CPU 30 starts downloading a first piece of audio data corresponding to the identification information from the music distribution server 11, and proceeds to the next step SP4. At step SP4, the CPU 30 waits until the download of the first piece of audio data is completed and, when the download of the first piece of audio data is completed, proceeds to the next step SP5.

At step SP5, the CPU 30 determines whether or not the download of all pieces of audio data indicated in the programming information has been completed. If the determination is negative, which means that there are one or more pieces of audio data the download of which has not been completed yet, the CPU 30 proceeds to step SP6. At step SP6, the CPU 30 starts a separate thread for downloading a second piece of audio data to be downloaded next to the first piece of audio data, and starts the download of the second piece of audio data with this separate thread. Then, the CPU 30 proceeds to step SP7.

Meanwhile, if the determination at the above-described step SP5 is affirmative, which means that the download of the pieces of audio data corresponding to all pieces of identification information indicated in the programming information has been completed, the CPU 30 proceeds to step SP7 without starting a separate thread.

At step SP7, the CPU 30 determines whether or not the portable player 14 is connected to the recording/reproducing apparatus 13 so as to be capable of communicating therewith. If the determination is negative, the CPU 30, without transferring the audio data to the portable player 14, proceeds to an end step SP10, thereby finishing the automatic recording/transferring procedure RT1.

Meanwhile, if the determination at step SP7 is affirmative, the CPU 30 proceeds to step SP8, at which the CPU 30 reads from the hard disk drive 31 the first piece of audio data already downloaded, and starts transferring the first piece of audio data to the portable player 14. Then, the CPU 30 proceeds to the next step SP9. Note that, in the case where the determination at the above-described step SP5 was negative, the CPU 30 performs the transfer of the first piece of audio data and the download of the second piece of audio data with the separate thread started at step SP6 in parallel after step SP8. Then, at step SP9, the CPU 30 waits until the transfer of the first piece of audio data is completed and, when the transfer of the first piece of audio data is completed, proceeds to the end step SP10, thereby finishing the automatic recording/transferring procedure RT1.

In the case where the separate thread was started at the above-described step SP6, the CPU 30 continues the download and transfer of the second piece of audio data with the separate thread even after the automatic recording/transferring procedure RT1 is finished. In this separate thread, the same automatic recording/transferring processes as the processes of steps SP3 to SP10 in the above-described automatic recording/transferring procedure RT1 are performed. In the case where there are further (third, fourth, etc.) pieces of audio data, the CPU 30 starts a separate thread as often as necessary. Then, when a thread for the last piece of audio data is finished, i.e., when the transfer of the last piece of audio data is completed, the automatic recording/transferring processes for the programming information are completed.

According to the above-described procedure, the CPU 30 of the recording/reproducing apparatus 13 automatically starts, at the previously set download start time, the download of the piece(s) of audio data the download of which has been programmed previously and automatically transfers the piece(s) of audio data to the portable player 14.

1-6. Operation and effects of first embodiment

If the download start time for particular audio data is set by the user, the recording/reproducing apparatus 13 according to the first embodiment, in accordance therewith, generates the programming information including the identification information for identifying the particular audio data and the download start time. The programming information is used for setting the recording/reproducing apparatus 13 to start the download of the particular audio data at the download start time.

Thereafter, when the recording/reproducing apparatus 13 detects that the download start time indicated in the programming information has come, the recording/reproducing apparatus 13 starts the download of the particular audio data from the music distribution server 11. Then, when the download of the particular audio data is completed (i.e., when the particular audio data is received and recorded on the hard disk drive 31), the recording/reproducing apparatus 13 reads out the downloaded audio data from the hard disk drive 31 and transfers the read audio data to the portable player 14 connected thereto so as to be capable of communicating therewith.

As described above, if only the user sets the download start time for the particular audio data, the recording/reproducing apparatus 13 starts the download of the particular audio data automatically at the download start time and then transfers the downloaded audio data to the portable player 14 automatically. Therefore, it is possible to perform the download and transfer of the audio data automatically at an arbitrary time without the need for the manual download operation and transferring operation.

Moreover, the recording/reproducing apparatus 13 is also capable of charging the battery of the portable player 14 connected thereto. Therefore, it is possible to perform the automatic download and transfer of the audio data while charging the battery of the portable player 14. That is, the recording/reproducing apparatus 13 allows the download and transfer of the audio data in the same manner as when charging the battery of the portable player 14 alone is performed, without the need for the user to bear in mind the download operation and transferring operation for the audio data.

Further, in the case where a plurality of pieces of audio data are downloaded, the recording/reproducing apparatus 13 starts, when the download of a piece of audio data is completed, the transfer of the piece of audio data downloaded to the portable player 14 and the download of the next piece of audio data.

Thus, in the case where a plurality of pieces of audio data are downloaded, the recording/reproducing apparatus 13 performs the transfer of a piece of audio data already downloaded and the download of the next piece of audio data in parallel (i.e., simultaneously). Therefore, the processing time is reduced as compared with the sequential processing in which the download and transfer of the plurality of pieces of audio data are performed one process after another.

According to the above-described first embodiment, the recording/reproducing apparatus 13 generates the programming information for programming it to download particular audio data at the download start time, and, upon detection that the download start time indicated in the programming information has come, starts the download of the particular audio data. Then, when the download of the particular audio data is completed, the recording/reproducing apparatus 13 automatically reads out the downloaded audio data from the hard disk drive 31 and transfers the read audio data to the portable player 14 connected thereto so as to be capable of communicating therewith. Therefore, if only the download start time is set for the audio data, the recording/reproducing apparatus 13 is able to automatically start the download of the audio data at the download start time and perform the automatic transfer of the downloaded audio data. Thus, the recording/reproducing apparatus 13 eliminates the user operation which have been required at the start of the download of the audio data, and allows the download and transfer of the audio data to be performed at an arbitrary time automatically from start to finish. Thus, the convenience with which the audio data is downloaded and transferred is greatly improved.

2. Second embodiment

Next, a second embodiment of the present invention will now be described below. The above-described first embodiment has been described with reference to an exemplary case where the recording/reproducing apparatus 13, when the set download start time has come, automatically downloads the particular audio data from the music distribution server 11 (i.e., receives the particular audio data and records it on the hard disk drive 31) and transfers the downloaded audio data to the portable player 14. In the second embodiment, the recording/reproducing apparatus 13 transmits the acquisition request for the particular audio data to the music distribution server 11 repeatedly on a regular basis and, when the particular audio data is updated at the music distribution server 11, downloads the updated audio data and transfers it to the portable player 14.

That is, in the second embodiment, the music distribution server 11 updates, on an irregular basis, audio data of a broadcasting program or the like recorded on the hard disk drive 21 (or uploads the audio data on an irregular basis). Meanwhile, the recording/reproducing apparatus 13 transmits to the music distribution server 11 the acquisition request for the audio data repeatedly on a regular basis, and, when the audio data corresponding to the acquisition request is uploaded, automatically downloads the uploaded audio data (i.e., the latest version of the audio data) as a result of the acquisition request transmitted after the upload and transfers the downloaded audio data to the portable player 14.

Incidentally, downloading and transferring the audio data, which is updated at the server on an irregular basis, each time it is updated is also referred to as "podcasting".

In practice, when the CPU 30 of the recording/reproducing apparatus 13 detects that the user has specified, via the operation key 34, at least one piece of audio data available from the music distribution server 11 and set intervals (hereinafter referred to also as "acquisition request intervals") at which the acquisition request for the specified piece of audio data is to be transmitted to the music distribution server 11, the CPU 30, in response to the detection, generates programming information that indicates that the acquisition request for the specified piece of audio data should be transmitted to the music distribution server 11 on a regular basis at the set acquisition request intervals.

Thereafter, based on the current time obtained from the timer circuit (not shown) and the acquisition request intervals indicated in the programming information, the CPU 30 transmits to the music distribution server 11 the acquisition request for the specified piece of audio data repeatedly on a regular basis. The acquisition request contains the above-described identification information. The identification information may be any information as long as it is capable of identifying the latest version of the audio data. Examples of the identification information include content identification information capable of identifying the latest version of the audio data and a URL that is a network address of the latest version of the audio data. Moreover, the identification information may be any information as long as it enables the music distribution server 11 to identify the latest version of the audio data, and therefore, the identification information may be a search key for searching for the latest version of the audio data. In this case, examples of the identification information include a music title, an album title, an artist name, and a name of a composer corresponding to the particular audio data.

When the music distribution server 11 has uploaded the specified piece of audio data, the CPU 30, as a result of the acquisition request transmitted after the upload, downloads the uploaded audio data from the music distribution server 11 and transfers the downloaded audio data to the portable player 14.

Figure 8:
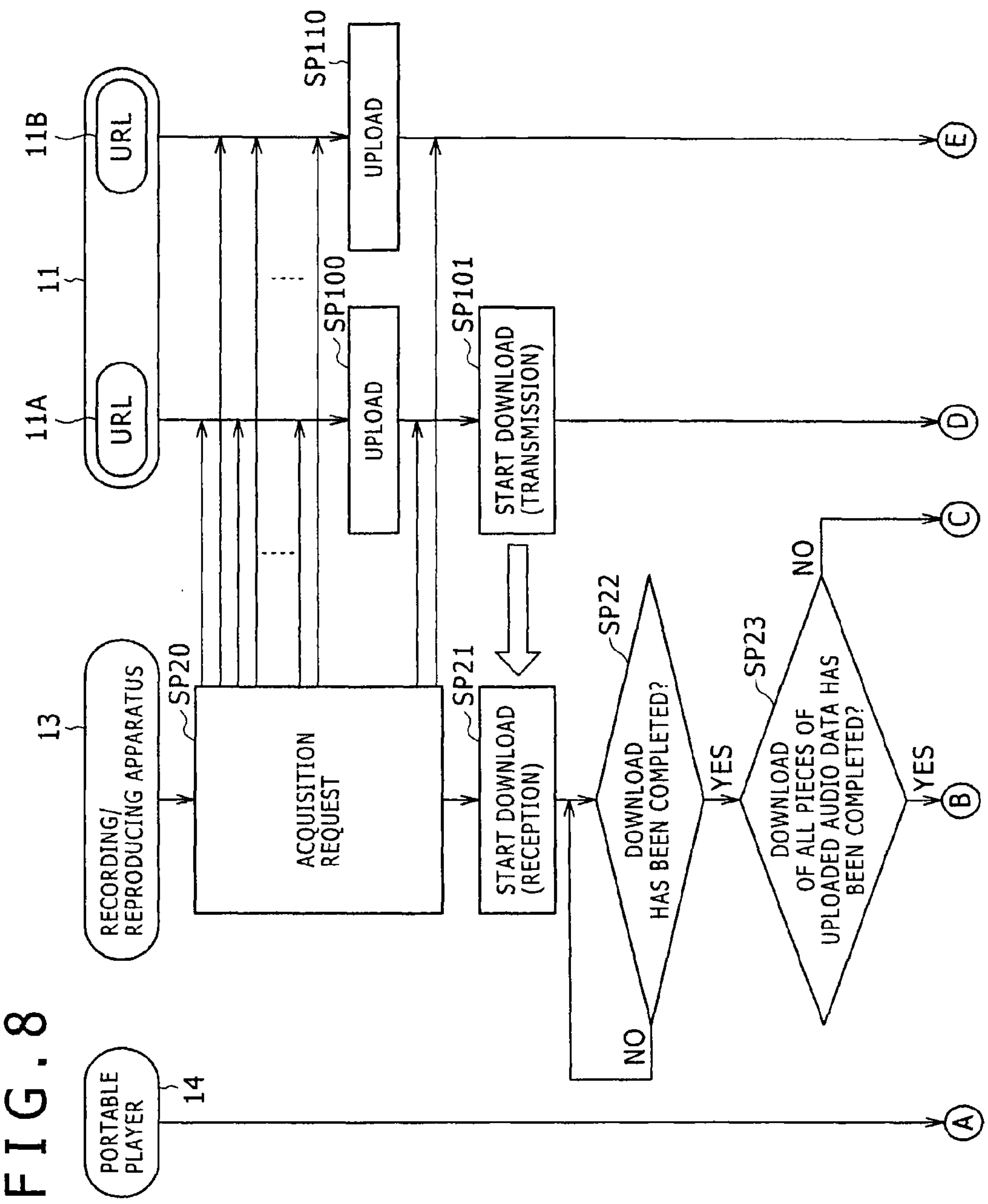
FIG. 8 is sequence chart illustrating an automatic recording/transferring procedure according to a second embodiment of the present invention.

Here, an automatic recording/transferring procedure (from the transmission of the acquisition request to the transfer of the audio data) according to the second embodiment will now be described below with reference to sequence charts of FIGS. 8 and 9. Note that the automatic recording/transferring procedure is performed by the CPU 30 of the recording/reproducing apparatus 13 in accordance with the program read from the hard disk drive 31 or the ROM 32 in conjunction with the CPU 20 of the music distribution server 11 and the CPU 50 of the portable player 14. The following description is made with reference to an exemplary case where two pieces of audio data identified by a URL 11A and a URL 11B, respectively, that are network addresses within the music distribution server 11 are uploaded almost simultaneously (or exactly simultaneously).

When the two pieces of audio data available from the music distribution server 11 are specified and the acquisition request intervals for the specified pieces of audio data is set, the CPU 30 of the recording/reproducing apparatus 13 generates the identification information for identifying the specified two pieces of audio data (which are, in the present example, the URL 11A and the URL 11B) and the programming information that indicates that the acquisition request for the specified two pieces of audio data should be transmitted to the music distribution server 11 regularly at the set acquisition request intervals, thereby starting the automatic recording/transferring procedure. Then, the CPU 30 proceeds to step SP20 as illustrated in FIG. 8.

At step SP20, the CPU 30 of the recording/reproducing apparatus 13 accesses the two URLs 11A and 11B within the music distribution server 11 indicated in the programming information (i.e., transmits the acquisition request) regularly at the acquisition request intervals indicated in the programming information.

While the recording/reproducing apparatus 13 accesses the two URLs 11A and 11B within the music distribution server 11 at regular intervals, the CPU 20 of the music distribution server 11 uploads the audio data identified by the URL 11A at step SP100 and, almost simultaneously, uploads the audio data identified by the URL 11B at step SP110.

After the two pieces of audio data identified by the URLs 11A and 11B, respectively, are uploaded almost simultaneously, the CPU 30 of the recording/reproducing apparatus 13, as a result of accessing the URL 11A and the URL 11B after the upload, starts the download of the two pieces of audio data in succession in conjunction with the music distribution server 11.

First, the CPU 30 of the recording/reproducing apparatus 13 starts the download of one of the two pieces of audio data (e.g., the audio data identified by the URL 11A), which have been uploaded almost simultaneously, in conjunction with the music distribution server 11.

That is, the CPU 20 of the music distribution server 11, at step SP101 to which the CPU 20 proceeds after the above-described step SP100, starts transmitting the uploaded audio data identified by the URL 11A to the recording/reproducing apparatus 13. Meanwhile, the CPU 30 of the recording/reproducing apparatus 13, at step SP21 to which the CPU 30 proceeds after the above-described step SP20, starts receiving the uploaded audio data identified by the URL 11A from the music distribution server 11.

After starting the download of the audio data identified by the URL 11A in the above-described manner, the CPU 30 of the recording/reproducing apparatus 13 proceeds to the next step SP22. At step SP22, the CPU 30 of the recording/reproducing apparatus waits until the download of the audio data identified by the URL 11A is completed and, when the download thereof is completed, proceeds to the next step SP23.

At step SP23, the CPU 30 of the recording/reproducing apparatus 13 determines whether the download of all pieces of audio data that are indicated in the programming information and have already been uploaded has been completed. In the present example, since the download of the audio data identified by the URL 11B has not been completed at this point, the determination at step SP23 is negative, and the CPU 30 proceeds to step SP24 (FIG. 9).

At step SP24, the CPU 30 of the recording/reproducing apparatus 13 starts a separate thread for downloading the audio data identified by the URL 11B, and starts downloading the audio data identified by the URL 11B with this separate thread. Then, the CPU 30 proceeds to step SP25. Note that, in the case where the audio data identified by the URL 11B has not been uploaded yet at this point, the determination at the above-described step SP23 is affirmative, and the CPU 30 proceeds to step SP25 without starting the separate thread.

At step SP25, the CPU 30 of the recording/reproducing apparatus 13 determines whether or not the portable player 14 is connected to the recording/reproducing apparatus 13 so as to be capable of communicating therewith. If the determination is negative, the CPU 30 continues accessing the URL 11A and the URL 11B at regular intervals without transferring the audio data identified by the URL 11A to the portable player 14.

Meanwhile, if the determination at step SP25 is affirmative, the CPU 30 of the recording/reproducing apparatus 13 proceeds to step SP26, at which the CPU 30 reads out the downloaded audio data identified by the URL 11A from the hard disk drive 31 and starts transferring the read audio data to the portable player 14.

That is, the CPU 30 of the recording/reproducing apparatus 13 starts transmitting the audio data identified by the URL 11A to the portable player 14 at step SP26. Meanwhile, the CPU 50 of the portable player 14 starts receiving the audio data identified by the URL 11A from the recording/reproducing apparatus 13 at step SP120.

After starting the transfer of the audio data identified by the URL 11A in the above-described manner, the CPU 30 of the recording/reproducing apparatus 13 proceeds to the next step SP27. At step SP27, the CPU 30 of the recording/reproducing apparatus waits until the transfer of the audio data identified by the URL 11A is completed and, when the transfer thereof is completed, continues accessing the URL 11A and the URL 11B at regular intervals.

At step SP130 in the separate thread, which is performed in parallel with the transfer of the audio data identified by the URL 11A (i.e., the processes of steps SP25 to SP27), the CPU 30 of the recording/reproducing apparatus 13 starts the download of the audio data identified by the URL 11B in conjunction with the music distribution server 11.

That is, the CPU 20 of the music distribution server 11, at step SP111 to which the CPU 20 proceeds after the above-described step SP110, starts transmitting the uploaded audio data identified by the URL 11B to the recording/reproducing apparatus 13. Meanwhile, the CPU 30 of the recording/reproducing apparatus 13 starts receiving the uploaded audio data identified by the URL 11B from the music distribution server 11 at step SP130.

After starting the download of the audio data identified by the URL 11B in the above-described manner, the CPU 30 of the recording/reproducing apparatus 13 proceeds to the next step SP131. At step SP131, the CPU 30 of the recording/reproducing apparatus 13 waits until the download of the audio data identified by the URL 11B is completed and, when the download thereof is completed, performs processes similar to the processes of the above-described step SP23 and the subsequent steps. Then, when the transfer of the audio data identified by the URL 11B to the portable player 14 is completed, the CPU 30 of the recording/reproducing apparatus 13 finishes the separate thread.

The CPU 30 of the recording/reproducing apparatus 13, when the specified audio data is uploaded, automatically downloads the uploaded audio data and transfers it to the portable player 14 according to the above-described procedure.

As described above, if only the user specifies the audio data and sets the acquisition request intervals for the audio data, the recording/reproducing apparatus 13 automatically transmits the acquisition request for the audio data to the music distribution server 11 repeatedly at the acquisition request intervals and, when the audio data corresponding to the acquisition request is uploaded, automatically downloads, as a result of the acquisition request transmitted after the upload, the uploaded audio data and transfers it to the portable player 14 connected to the recording/reproducing apparatus 13 so as to be capable of communicating therewith. Thus, it is possible to perform all processes related to the podcasting (i.e., from the download of the uploaded audio data to the transfer of the downloaded audio data) automatically. That is, the convenience with which the podcasting is used is greatly improved.

Moreover, in the case where a plurality of pieces of audio data are uploaded almost simultaneously, the recording/reproducing apparatus 13 performs the transfer of a piece of audio data already downloaded to the portable player 14 and the download of the next piece of audio data in parallel (i.e., simultaneously). Therefore, the processing time is reduced as compared with the sequential processing in which the download and transfer of the plurality of pieces of audio data are performed one process after another.

Note that the recording/reproducing apparatus 13 is able to determine whether or not the audio data has been uploaded based on update information, such as an update time, added to the audio data recorded in the music distribution server 11, for example.

3. Third embodiment

Next, a third embodiment of the present invention will now be described below. In the third embodiment, the recording/reproducing apparatus 13 is capable of, when a previously set time has come, automatically ripping the audio data recorded on the CD 45 mounted on the CD drive 36 and transferring the ripped audio data to the portable player 14. In addition, the recording/reproducing apparatus 13 is also capable of, when a previously set time has come, automatically recording the broadcast signal received by the tuner 43 as audio data and transferring the recorded audio data to the portable player 14. Moreover, the recording/reproducing apparatus 13 is also capable of, when a previously set time has come, automatically recording the audio signal inputted via the audio input terminal 44 as audio data and transferring the recorded audio data to the portable player 14.

In short, the recording/reproducing apparatus 13 according to the third embodiment is capable of automatically performing, at the times previously set by the user, the ripping and transfer of the audio data recorded on the CD 45, the recording and transfer of the broadcast signal received by the tuner 43, and the recording and transfer of the audio signal inputted via the audio input terminal 44.

In practice, when the CPU 30 of the recording/reproducing apparatus 13 detects that the user has set, via the operation key 34, a time (hereinafter referred to also as a "ripping start time") at which the ripping of the audio data recorded on the CD 45 mounted on the CD drive 36 should be started, the CPU 30, in response to the detection, generates programming information for programming the recording/reproducing apparatus 13 to start the ripping of the audio data recorded on the CD 45 at the set ripping start time.

Thereafter, when the CPU 30 detects that the current time obtained from the timer circuit (not shown) has reached the ripping start time indicated in the programming information, i.e., when the ripping start time set by the user has come, the CPU 30 starts the ripping of the audio data recorded on the CD 45 mounted on the CD drive 36.

Then, when the ripping of the audio data is completed, the CPU 30 reads out the ripped audio data from the hard disk drive 31 and transfers the read audio data to the portable player 14 connected to the recording/reproducing apparatus 13 via the USB interface 39.

As described above, if only the user sets the ripping start time, the recording/reproducing apparatus 13 is able to automatically start, at the ripping start time, the ripping of the audio data and automatically transfer the ripped audio data to the portable player 14. That is, there is no need for the manual ripping operation or transferring operation, and the ripping and transfer of the audio data can be performed automatically at an arbitrary time. Therefore, the convenience with which the ripping and transfer of the audio data are performed is greatly improved.

Further, when the CPU 30 detects that the user has set, via the operation key 34, a time (hereinafter referred to also as a "broadcast recording start time") at which the recording of a particular broadcast signal received by the tuner 43 should be started and a time (hereinafter referred to also as a "broadcast recording end time") at which the recording thereof should be ended, the CPU 30, in response to the detection, generates programming information for programming the recording/reproducing apparatus 13 to start, at the set broadcast recording start time, the recording of the broadcast signal received by the tuner 43 and end the recording at the broadcast recording end time. Note that the particular broadcast signal in the present example refers to a broadcast signal that is broadcast from a broadcasting station specified by the user.

Thereafter, when the CPU 30 detects that the current time obtained from the timer circuit (not shown) has reached the broadcast recording start time indicated in the programming information, i.e., when the broadcast recording start time set by the user has come, the CPU 30 controls the tuner 43 to receive the particular broadcast signal and starts the recording of the broadcast signal received by the tuner 43 at this time.

Then, when the broadcast recording end time has come, the CPU 30 ends the recording of the broadcast signal, reads out from the hard disk drive 31 the audio data recorded on the hard disk drive 31 as a result of the recording, and transfers the read audio data to the portable player 14 connected to the recording/reproducing apparatus 13 via the USB interface 39.

As described above, if only the user specifies the broadcasting station, the broadcast recording start time, and the broadcast recording end time, the recording/reproducing apparatus 13 is able to automatically start, at the broadcast recording start time, the recording of the broadcast signal broadcast from the specified broadcasting station and end the recording at the broadcast recording end time, and automatically transfer the audio data obtained by the recording to the portable player 14. That is, there is no need for a manual broadcast recording operation or a manual transferring operation, and the recording and transfer of the broadcast signal can be performed automatically at an arbitrary time. Therefore, the convenience with which the recording and transfer of the broadcast signal are performed is greatly improved.

Further, when the CPU 30 detects that the user has set, via the operation key 34, a time (hereinafter referred to also as an "input audio recording start time") at which the recording of the audio signal inputted via the audio input terminal 44 should be started and a time (hereinafter referred to also as an "input audio recording end time") at which the recording thereof should be ended, the CPU 30, in response to the detection, generates programming information for programming the recording/reproducing apparatus 13 to start, at the set input audio recording start time, the recording of the audio signal inputted via the audio input terminal 44 and end the recording at the input audio recording end time.

Thereafter, when the CPU 30 detects that the current time obtained from the timer circuit (not shown) has reached the input audio recording start time indicated in the programming information, i.e., when the input audio recording start time set by the user has come, the CPU 30 starts the recording of the audio signal inputted via the audio input terminal 44.

Then, when the input audio recording end time has come, the CPU 30 ends the recording of the audio signal, reads out from the hard disk drive 31 the audio data recorded on the hard disk drive 31 as a result of the recording, and transfers the read audio data to the portable player 14 connected to the recording/reproducing apparatus 13 via the USB interface 39.

As described above, if only the user sets the input audio recording start time and the input audio recording end time, the recording/reproducing apparatus 13 is able to automatically start, at the input audio recording start time, the recording of the audio signal inputted via the audio input terminal 44 and end the recording thereof at the input audio recording end time, and automatically transfer the audio data obtained by the recording to the portable player 14. That is, there is no need for a manual input audio recording operation or a manual transferring operation, and the recording and transfer of the audio signal inputted via the audio input terminal 44 can be performed automatically at an arbitrary time. Therefore, the convenience with which the recording and transfer of the audio signal inputted via the audio input terminal 44 are performed is greatly improved.

The automatic recording/transferring procedure (i.e., from the recording of the audio data to the transfer thereof) according to the third embodiment will now be described below: first, with reference to the case where the audio data recorded on the CD 45 is ripped and transferred (hereinafter, this case will be simply referred to as "the case of ripping"); second, with reference to the case where the broadcast signal received by the tuner 43 is recorded and transferred (hereinafter, this case will be simply referred to as "the case of broadcast recording"); and third, with reference to the case where the audio signal inputted via the audio input terminal 44 is recorded and transferred (hereinafter, this case will be simply referred to as "the case of input audio recording"). Note that the automatic recording/transferring procedure in each case is also a process flow performed by the CPU 30 of the recording/reproducing apparatus 13 in accordance with the program read from the hard disk drive 31 or the ROM 32.

Figure 10:
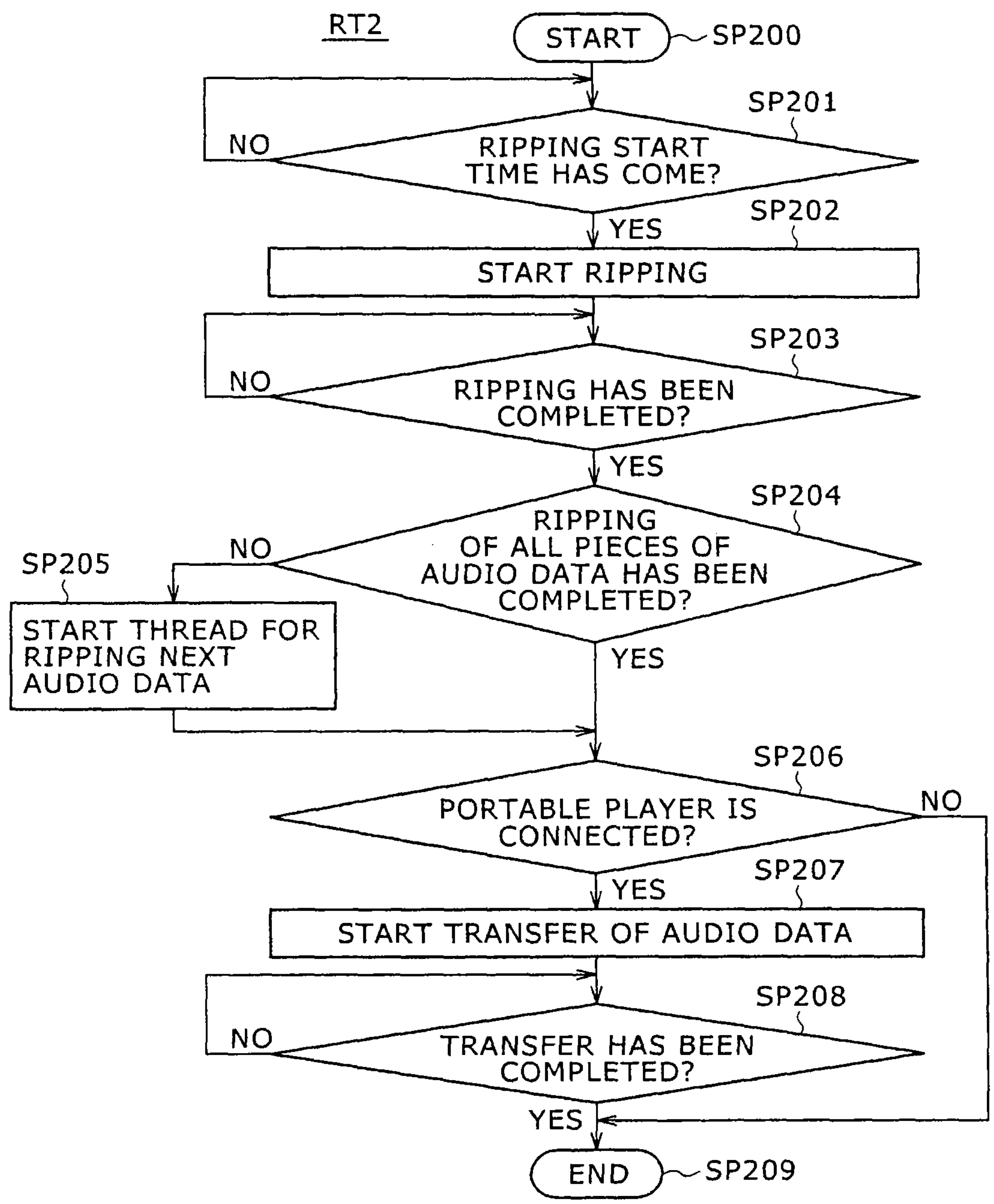
FIG. 10 is a flowchart illustrating an automatic recording/transferring procedure (in the case of ripping) according to a third embodiment of the present invention.

First, the automatic recording/transferring procedure in the case of ripping will now be described below with reference to a flowchart of FIG. 10. When the user sets the ripping start time for the audio data recorded on the CD 45 mounted on the CD drive 36, the CPU 30 of the recording/reproducing apparatus 13 generates the programming information including the ripping start time, and starts an automatic recording/transferring procedure RT2 with step SP200. Then, the CPU 30 proceeds to the next step SP201.

At step SP201, based on the current time obtained from the timer circuit (not shown), the CPU 30 waits until the ripping start time indicated in the programming information comes and, when the ripping start time has come, proceeds to the next step SP202.

At step SP202, the CPU 30 starts ripping audio data of a first track of the CD 45 mounted on the CD drive 36, and proceeds to the next step SP203. At step SP203, the CPU 30 waits until the ripping of the audio data of the first track is completed and, when the ripping of the audio data of the first track is completed, proceeds to the next step SP204.

At step SP204, the CPU 30 determines whether ripping of audio data of each track of the CD 45 has been completed. If the determination is negative, which means that there is still audio data the ripping of which has not been completed yet, the CPU 30 proceeds to step SP205. At step SP205, the CPU 30 starts a separate thread for ripping audio data of a second track of the CD 45, and starts ripping the audio data of the second track with the separate thread. Then, the CPU 30 proceeds to step SP206.

Meanwhile, if the determination at the above-described step SP204 is affirmative, which means that the ripping of the audio data of each track of the CD 45 has been completed, the CPU 30 proceeds to step SP206 without starting the separate thread.

At step SP206, the CPU 30 determines whether the portable player 14 is connected to the recording/reproducing apparatus 13 so as to be capable of communicating therewith. If the determination is negative, the CPU 30 proceeds to an end step SP209 without transferring the audio data to the portable player 14, thereby finishing the automatic recording/transferring procedure RT2.

Meanwhile, if the determination at step SP206 is affirmative, the CPU 30 proceeds to step SP207, at which the CPU 30 reads from the hard disk drive 31 the ripped audio data of the first track, and starts transferring the read audio data to the portable player 14. Then, the CPU 30 proceeds to the next step SP208. Note that, in the case where the determination at the above-described step SP204 was negative, the CPU 30 performs, after step SP207, the transfer of the ripped audio data of the first track and the ripping of the audio data of the second track with the separate thread started at step SP205 in parallel. Then, at step SP208, the CPU 30 waits until the transfer of the ripped audio data of the first track is completed and, when the transfer of the ripped audio data of the first track is completed, proceeds to the end step SP209, thereby finishing the automatic recording/transferring procedure RT2.

In the case where the separate thread was started at the above-described step SP205, the CPU 30 continues, even after the end of the automatic recording/transferring procedure RT2, the ripping and transfer of the audio data of the second track with the separate thread. In the separate thread, processes for automatic recording and transfer similar to those of steps SP202 to SP209 in the above-described automatic recording/transferring procedure RT2 are performed. In the case where there is further audio data (i.e., audio data of third, fourth, etc., tracks of the CD 45), the CPU 30 starts a separate thread as often as necessary and, when a thread for the audio data of the last track is completed, i.e., when the transfer of the audio data of the last track is completed, finishes the automatic recording/transferring procedure for the programming information.

According to the above-described procedure, the CPU 30 of the recording/reproducing apparatus 13 automatically starts, at the set ripping start time, the ripping of the audio data which the recording/reproducing apparatus 13 has previously been programmed to rip, and transfers the ripped audio data to the portable player 14.

As described above, in the case where a plurality of pieces of audio data are recorded on the CD 45, the recording/reproducing apparatus 13 performs the transfer of a piece of audio data already ripped to the portable player 14 and the ripping of the next piece of audio data in parallel (i.e., simultaneously). Therefore, the processing time is reduced as compared with a sequential processing in which the ripping and transfer of the plurality of pieces of audio data are performed one process after another.

Figure 11:
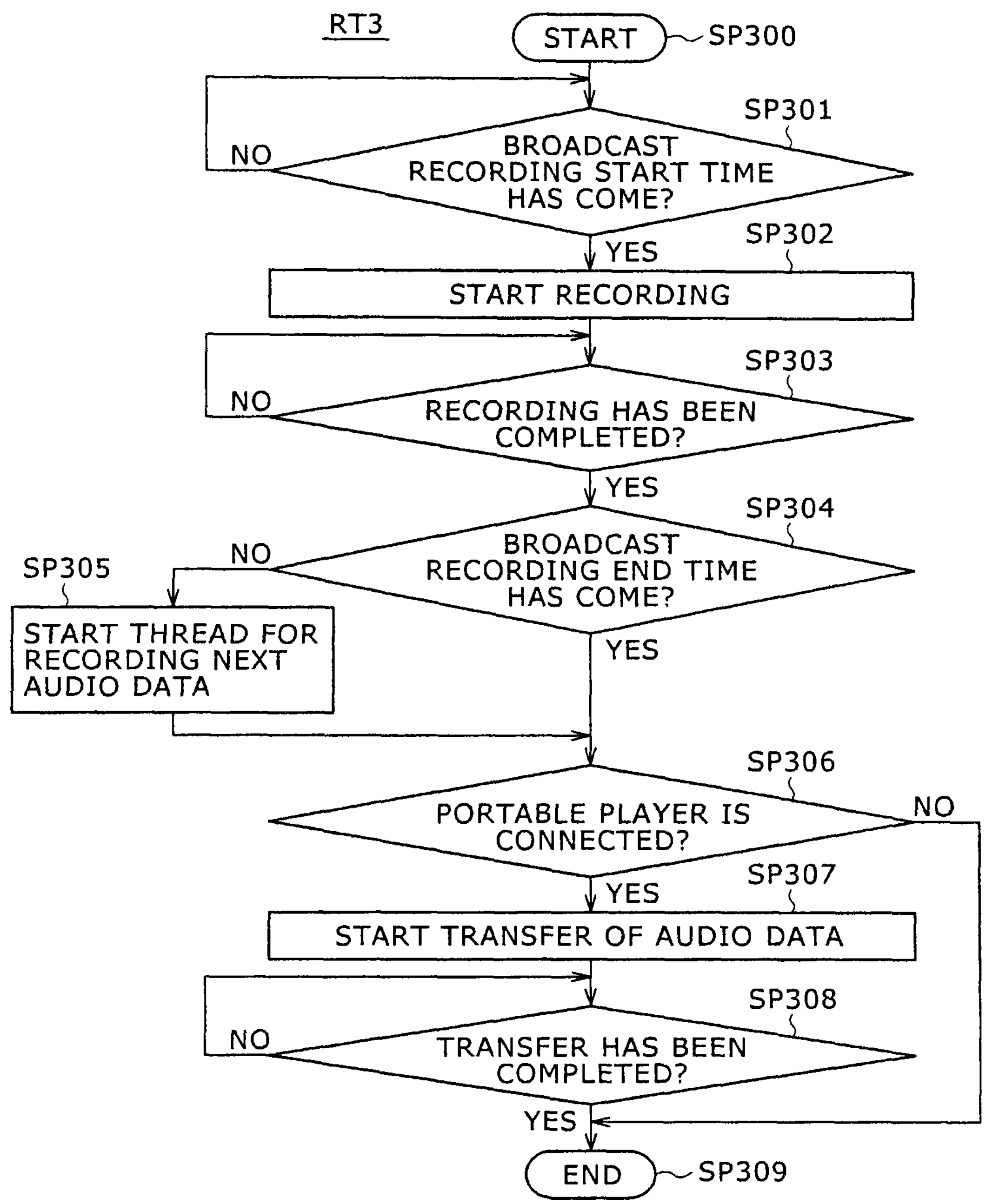
FIG. 11 is a flowchart illustrating an automatic recording/transferring procedure (in the case of broadcast recording) according to the third embodiment.

Next, the automatic recording/transferring procedure in the case of broadcast recording will now be described below with reference to a flowchart of FIG. 11. When the user sets the broadcast recording start time and the broadcast recording end time for the particular broadcast signal received by the tuner 43, the CPU 30 of the recording/reproducing apparatus 13 generates the programming information including a channel of the specified broadcasting station, the broadcast recording start time, and the broadcast recording end time, and starts an automatic recording/transferring procedure RT3 with step SP300. Then, the CPU 30 proceeds to step SP301.

At step SP301, based on the current time obtained from the timer circuit (not shown), the CPU 30 waits until the broadcast recording start time indicated in the programming information comes and, when the broadcast recording start time has come, proceeds to the next step SP302.

At step SP302, the CPU 30 starts a process of recording the broadcast signal of the channel indicated in the programming information as audio data. Then, the CPU 30 proceeds to the next step SP303. At step SP303, the CPU 30 waits, for example, until recording of audio data of a first broadcasting program is completed, and, when the recording of the audio data of the first broadcasting program is completed, proceeds to the next step SP304. Note that the CPU 30 of the recording/reproducing apparatus 13 acquires, for example, program information that indicates start and end times of broadcasting programs from an outside via the network 12, and, based on this program information, records the broadcast signal indicated in the programming information such that the audio data will be recorded on a program by program basis.

At step SP304, based on the current time obtained from the timer circuit (not shown), the CPU 30 determines whether or not the broadcast recording end time indicated in the programming information has come. If the determination is negative, which means that the broadcast recording end time has not come yet, the CPU 30 proceeds to step SP305. At step SP305, the CPU 30 starts a separate thread for recording audio data of a second broadcasting program, and starts the recording of the audio data of the second broadcasting program following to that of the first broadcasting program with the separate thread. Then, the CPU 30 proceeds to step SP306.

Meanwhile, if the determination at the above-described step SP304 is affirmative, which means that the broadcast recording end time has come, the CPU 30 proceeds to step SP306 without starting the separate thread.

At step SP306, the CPU 30 determines whether or not the portable player 14 is connected to the recording/reproducing apparatus 13 so as to be capable of communicating therewith. If the determination is negative, the CPU 30 proceeds to an end step SP309 without transferring the audio data to the portable player 14, thereby finishing the automatic recording/transferring procedure RT3.

Meanwhile, if the determination at step SP306 is affirmative, the CPU 30 proceeds to step SP307, at which the CPU 30 reads out from the hard disk drive 31 the recorded audio data of the first broadcasting program, and starts transferring the read audio data to the portable player 14. Then, the CPU 30 proceeds to the next step SP308. Note that, in the case where the determination at the above-described step SP304 was negative, the CPU 30 performs, after step SP307, the transfer of the audio data of the first broadcasting program and the recording of the audio data of the second broadcasting program with the separate thread started at step SP305 in parallel. At step SP308, the CPU 30 waits until the transfer of the audio data of the first broadcasting program is completed, and, when the transfer of the audio data of the first broadcasting program is completed, proceeds to the end step SP309, thereby finishing the automatic recording/transferring procedure RT3.

In the case where the separate thread was started at the above-described step SP305, the CPU 30 continues, even after the end of the automatic recording/transferring procedure RT3, the recording and transfer of the audio data of the second broadcasting program with the separate thread. In the separate thread, processes for automatic recording and transfer similar to those of steps SP302 to SP309 in the above-described automatic recording/transferring procedure RT3 are performed. In the case where there is further audio data (i.e., audio data of a third broadcasting program, a fourth broadcasting program, and so on), the CPU 30 starts a separate thread as often as necessary and, when a thread for audio data of the last of the broadcasting programs that are broadcast between the broadcast recording start time and the broadcast recording end time is completed, i.e., when the transfer of the audio data of the last broadcasting program is completed, finishes the automatic recording/transferring procedure for the programming information.

According to the above-described procedure, the CPU 30 of the recording/reproducing apparatus 13 automatically records, between the set broadcast recording start time and the set broadcast recording end time, the broadcast signal which the recording/reproducing apparatus 13 has previously been programmed to record as pieces of audio data each corresponding to a separate broadcasting program, and automatically transfers the recorded pieces of audio data to the portable player 14.

As described above, in the case where a plurality of broadcasting programs are broadcast between the broadcast recording start time and the broadcast recording end time, the recording/reproducing apparatus 13 performs the transfer of the already recorded audio data of a broadcasting program to the portable player 14 and the recording of the audio data of the next broadcasting program in parallel (i.e., simultaneously). Therefore, the processing time is reduced as compared with the sequential processing in which the recording and transfer of the plurality of pieces of audio data are performed one process after another.

Figure 12:
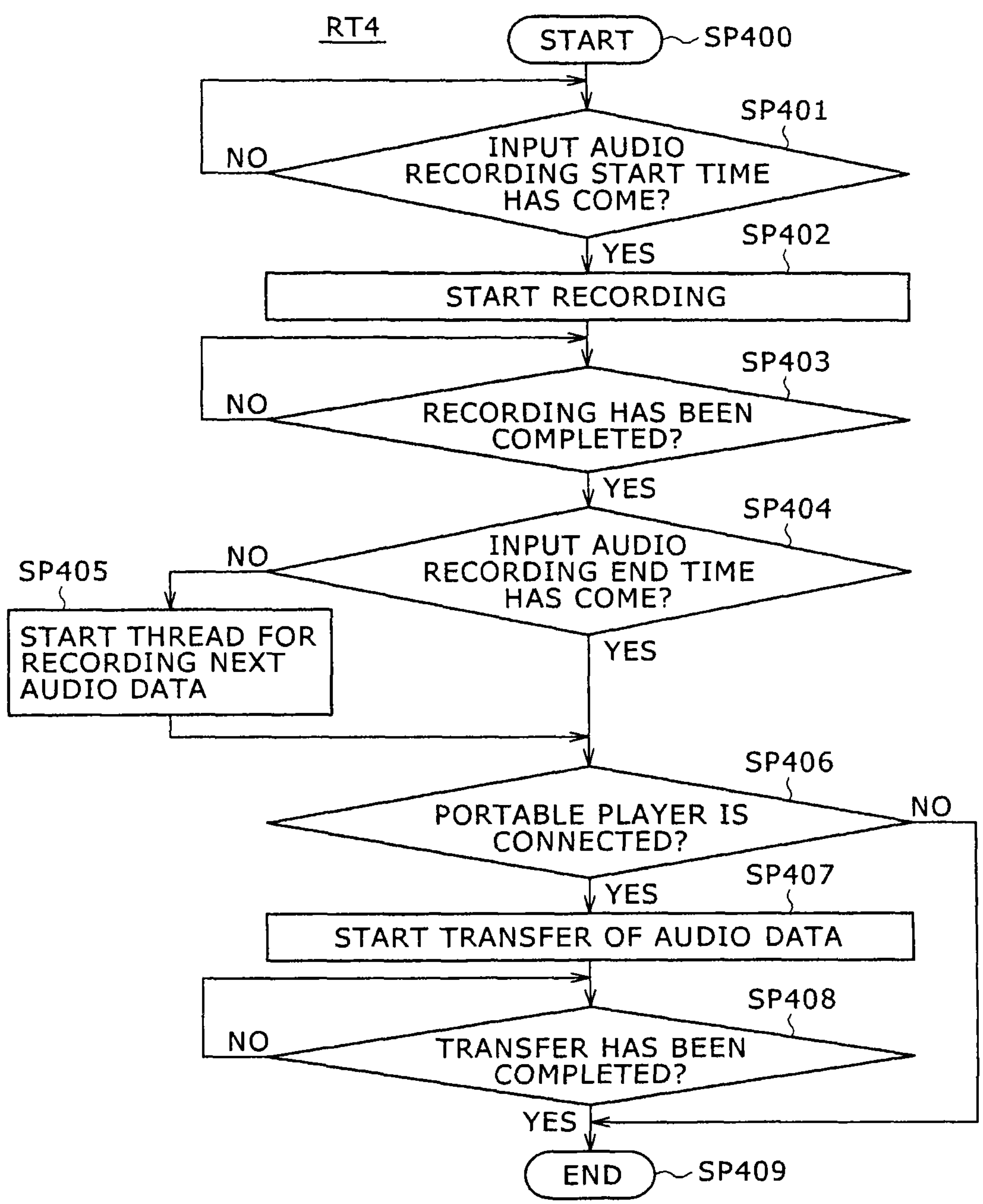
FIG. 12 is a flowchart illustrating an automatic recording/transferring procedure (in the case of input audio recording) according to the third embodiment.

Next, the automatic recording/transferring procedure in the case of input audio recording will now be described below with reference to a flowchart of FIG. 12. The CPU 30 of the recording/reproducing apparatus 13 generates the programming information including the input audio recording start time and the input audio recording end time, and starts an automatic recording/transferring procedure RT4 with step SP400. Then, the CPU 30 proceeds to step SP401.

At step SP401, based on the current time obtained from the timer circuit (not shown), the CPU 30 waits until the input audio recording start time indicated in the programming information comes and, when the input audio recording start time has come, proceeds to the next step SP402.

At step SP402, the CPU 30 starts a process of recording the audio signal inputted via the audio input terminal 44 as audio data, and proceeds to the next step SP403. At step SP403, the CPU 30 waits, for example, until recording of audio data of a first musical piece is completed and, when the recording of the audio data of the first musical piece is completed, proceeds to the next step SP404. Note that the CPU 30 of the recording/reproducing apparatus 13 detects, for example, a silent portion(s) of the audio signal inputted via the audio input terminal 44, and records the audio signal as pieces of audio data each corresponding to a separate musical piece, with a boundary between musical pieces defined by the silent portion.

At step SP404, based on the current time obtained from the timer circuit (not shown), the CPU 30 determines whether the input audio recording end time indicated in the programming information has come. If the determination is negative, which means that the input audio recording end time has not come yet, the CPU 30 proceeds to step SP405. At step SP405, the CPU 30 starts a separate thread for recording audio data of a second musical piece following to that of the first musical piece, and starts the recording of the audio data of the second musical piece with the separate thread. Then, the CPU 30 proceeds to step SP406.

Meanwhile, if the determination at the above-described step SP404 is affirmative, which means that the input audio recording end time has come, the CPU 30 proceeds to step SP406 without starting the separate thread.

At step SP406, the CPU 30 determines whether or not the portable player 14 is connected to the recording/reproducing apparatus 13 so as to be capable of communicating therewith. If the determination is negative, the CPU 30 proceeds to an end step SP409 without transferring the audio data to the portable player 14, thereby finishing the automatic recording/transferring procedure RT4.

Meanwhile, if the determination at step SP406 is affirmative, the CPU 30 proceeds to step SP407, at which the CPU 30 reads out from the hard disk drive 31 the recorded audio data of the first musical piece, starts the transfer of the read audio data to the portable player 14, and proceeds to the next step SP408. Note that, in the case where the determination at the above-described step SP404 was negative, the CPU 30 performs, after step SP407, the transfer of the audio data of the first musical piece and the recording of the audio data of the second musical piece with the separate thread started at step SP405 in parallel. Then, at step SP408, the CPU 30 waits until the transfer of the audio data of the first musical piece is completed and, when the transfer of the audio data of the first musical piece is completed, proceeds to the end step SP409, thereby finishing the automatic recording/transferring procedure RT4.

In the case where the separate thread was started at the above-described step SP405, the CPU 30 continues, even after the end of the automatic recording/transferring procedure RT4, the recording and transfer of the audio data of the second musical piece with the separate thread. In this separate thread, processes for automatic recording and transfer similar to those of steps SP402 to SP409 in the above-described automatic recording/transferring procedure RT4 are performed. In the case where there is further audio data (i.e., audio data of a third musical piece, a fourth musical piece, and so on), the CPU 30 starts a separate thread as often as necessary and, when a thread for audio data of the last of the musical pieces inputted between the input audio recording start time and the input audio recording end time is completed, i.e., when the transfer of the audio data of the last musical piece is completed, finishes the automatic recording/transferring procedure for the programming information.

According to the above-described procedure, the CPU 30 of the recording/reproducing apparatus 13 automatically records, between the set input audio recording start time and the set input audio recording end time, the audio signal which the recording/reproducing apparatus 13 has previously been programmed to record as pieces of audio data each corresponding to a separate musical piece, and automatically transfers the recorded pieces of audio data to the portable player 14.

As described above, in the case where a plurality of musical pieces are inputted between the input audio recording start time and the input audio recording end time, the recording/reproducing apparatus 13 performs the transfer of the already recorded audio data of a musical piece to the portable player 14 and the recording of the audio data of the next musical piece in parallel (i.e., simultaneously). Therefore, the processing time is reduced as compared with the sequential processing in which the recording and transfer of the plurality of pieces of audio data are performed one process after another.

4. Other embodiments

The above-described embodiments have been described with reference to the exemplary case where the present invention is applied to the case where the recording/reproducing apparatus 13 records the audio data as a content and transfers the recorded audio data to the portable player 14. However, the present invention is not limited to this example. The present invention is widely applicable to various cases where a recording apparatus capable of recording a content records the content and transfers the recorded content to a device capable of using the content. For example, the present invention is applicable to a case where a recording apparatus capable of recording video data records the video data and transfers the recorded video data to a reproduction apparatus capable of reproducing the video data. Further, the present invention is also applicable to a case where a recording apparatus capable of recording a program records the program and transfers the recorded program to an information processing apparatus capable of executing the program.

The above-described first embodiment has been described with reference to the case where the download start time for the particular audio data is set by the user. However, the present invention is not limited to this example. Alternatively, the download start time may be set by the CPU 30 of the recording/reproducing apparatus 13. In this case, the CPU 30 sets the download start time, for example, at a time when the recording/reproducing apparatus 13 is not used by the user, e.g., after midnight. Thus, if only the user specifies the audio data to be downloaded, the CPU 30 is able to automatically download the audio data from the music distribution server 11 and transfer the downloaded audio data to the portable player 14 during the time when the recording/reproducing apparatus 13 is not used by the user. Similarly, the acquisition request intervals in the second embodiment and the ripping start time in the third embodiment may also be set by the CPU 30 of the recording/reproducing apparatus 13. In this case, the CPU 30 may determine the time when the recording/reproducing apparatus 13 is not used by the user, for example, based on time information previously set in the recording/reproducing apparatus 13 or based on learning.

Further, the above-described embodiments have been described with reference to the exemplary case where, as described above with respect to the automatic recording/transferring procedure RT1, the CPU 30 of the recording/reproducing apparatus 13 checks, after the completion of the download of the audio data and before the transfer of the downloaded audio data to the portable player 14, whether or not the portable player 14 is connected to the recording/reproducing apparatus 13 so as to be capable of communicating therewith. However, the present invention is not limited to this example. This check may be performed at any time as long as it is before the transfer of the audio data to the portable player 14. For example, the check may be performed before the start of the download of the audio data.

Still further, the above-described embodiments have been described with reference to the exemplary case where the recording/reproducing apparatus 13 and the portable player 14 are connected to each other via the respective USB interfaces 39 and 54. However, the present invention is not limited to this example. The recording/reproducing apparatus 13 and the portable player 14 can also be connected in various other manners, such as a wired LAN connection, a wireless LAN connection, and an infrared connection.

Still further, the above-described first embodiment has been described with reference to the exemplary case where, when the download start time is set by the user, the CPU 30 of the recording/reproducing apparatus 13 generates the programming information and starts the automatic recording/transferring procedure RT1 with step SP1, and proceeds to the next step SP2. However, the present invention is not limited to this example. For example, when the download start time is set by the user, the CPU 30 may start the automatic recording/transferring procedure RT1 with step SP1 and, before proceeding to step SP2, perform the step of generating the programming information. In other words, the step of generating the programming information may be inserted between step SP1 and step SP2 of the automatic recording/transferring procedure RT1.

Still further, the above-described embodiments have been described with reference to the exemplary case where the CPU 30 of the recording/reproducing apparatus 13 performs the above-described automatic recording/transferring procedure in accordance with the program installed on the hard disk drive 31 or the ROM 32. However, the present invention is not limited to this example. For example, the program for performing the automatic recording/transferring procedure may be recorded on a recording medium such as a CD and read therefrom.

Still further, one of the above-described embodiments has been described with reference to the exemplary case where the broadcast signal is recorded as a plurality of pieces of audio data each corresponding to a separate broadcasting program based on the program information acquired from the outside. However, the present invention is not limited to this example. For example, the broadcast signal may be recorded as a plurality of pieces of audio data each corresponding to a separate musical piece based on a volume level of the broadcast signal or a result of frequency analysis of the broadcast signal. Further, the broadcast signal may be divided at regular intervals and recorded as a plurality of pieces of audio data each corresponding to a separate period of the same length (e.g., ten minutes) set by the user. That is, the broadcast signal can be divided into parts using various types of information usable for such division and recorded as a plurality of pieces of audio data each corresponding to a separate part of the broadcasting signal.

Still further, one of the above-described embodiments has been described with reference to the exemplary case where the audio signal is recorded as a plurality of pieces of audio data each corresponding to a separate musical piece, with the boundary between musical pieces defined by the silent portion of the audio signal inputted via the audio input terminal 44. However, the present invention is not limited to this example. For example, the audio signal may be recorded as a plurality of pieces of audio data each corresponding to a separate musical piece based on a volume level of the audio signal or a result of frequency analysis of the audio signal. Further, the audio signal may be divided at regular intervals and recorded as a plurality of pieces of audio data each corresponding to a separate period of the same length (e.g., ten minutes) set by the user. That is, the audio signal can be divided into parts using various types of information usable for such division and recorded as a plurality of pieces of audio data each corresponding to a separate part of the audio signal.

Still further, only one of the above-described embodiments may be implemented by the recording/reproducing apparatus 13, or alternatively, some or all of the above-described embodiments may be implemented by the recording/reproducing apparatus 13. In the case where the automatic recording/transferring function according to the above-described first embodiment (i.e., in the case of download) and the automatic recording/transferring function (in the case of ripping) according to the above-described third embodiment are implemented by the recording/reproducing apparatus 13 and the download start time indicated in the programming information for download and the ripping start time indicated in the programming information for ripping are set at almost the same time (or exactly at the same time), the recording/reproducing apparatus 13 may start the ripping after the download is completed, for example. That is, the recording/reproducing apparatus 13 may perform the transfer of the last piece of audio data that has been downloaded and the ripping of the audio data of the first track of the CD 45 in parallel (i.e., simultaneously). Thus, the processing time can be reduced as compared with the sequential processing in which the download and transfer of the audio data and the ripping and transfer of the audio data are performed one process after another.

Meanwhile, in the case where the automatic recording/transferring function (in the case of ripping) and the automatic recording/transferring function (in the case of broadcast recording) according to the above-described third embodiment are implemented by the recording/reproducing apparatus 13 and the ripping start time indicated in the programming information for ripping and the broadcast recording start time indicated in the programming information for broadcast recording are set almost at the same time, the recording/reproducing apparatus 13 may start the ripping after the broadcast recording that need be performed at the set broadcast recording start time is completed. That is, the recording/reproducing apparatus 13 may perform the transfer of the recorded audio data of the last broadcasting program and the ripping of the audio data of the first track of the CD 45 in parallel (i.e., simultaneously). Thus, the recording/reproducing apparatus 13 achieves reduction in processing time as compared with the sequential processing in which the recording and transfer of the audio data and the ripping and transfer of the audio data are performed one process after another. In the case where the broadcast recording start time has come when the ripping is being performed, the recording/reproducing apparatus 13 may suspend the ripping for the time being and start the broadcast recording, and, after the broadcast recording is completed, resume the ripping. By giving priority to a process, such as the broadcast recording, that need be performed at the previously set time, the recording/reproducing apparatus 13 becomes able to perform the recording and transfer of the audio data without fail as the user desires.

In the case where the recording/reproducing apparatus 13 implements a plurality of types of automatic recording/transferring functions as in the above cases, the recording/reproducing apparatus 13 may generate a plurality of pieces of programming information each corresponding to a separate type of automatic recording/transferring function, or alternatively may generate a single piece of programming information containing the plurality of pieces of programming information in an integrated form. In the latter case, the single piece of programming information containing the plurality of pieces of programming information each corresponding to a separate type of automatic recording/transferring function in an integrated form may include, for example, function identification information that indicates which type of automatic recording and transfer (download, podcasting, ripping, broadcast recording, or input audio recording) is performed and the time at which that type of automatic recording and transfer should be performed (or, in the case of podcasting, the intervals at which the acquisition request is transmitted). Further, with a degree of priority set for each type of automatic recording/transferring function or for each piece of function identification information, the recording/reproducing apparatus 13 may perform the plurality of types of automatic recording and transfer in descending order of priority.

The above-described embodiments have been described with reference to the exemplary case where the recording/reproducing apparatus 13 as an information processing apparatus includes the CPU 30, the hard disk drive 31, the ROM 32, the RAM 33, the operation key 34, the network interface 35, the CD drive 36, the audio processing module 37, the display controller 38, the USB interface 39, the bus 40, the display 41, the analog processing module 42, the loudspeaker 16, the tuner 43, and the audio input terminal 44. However, the present invention is not limited to this example. The recording/reproducing apparatus 13 may have any structure as long as it implements the same functions.

Note that the recording medium 2 of the recording/transferring apparatus 1 as illustrated in FIG. 1 corresponds to the hard disk drive 31 of the recording/reproducing apparatus 13 as illustrated in FIG. 4, that the transfer section 5 of the recording/transferring apparatus 1 (FIG. 1) corresponds to the USB interface 39 of the recording/reproducing apparatus 13 (FIG. 4), and that the programming information generation section 3 and the recording start section 4 of the recording/transferring apparatus 1 (FIG. 1) correspond to the CPU 30 of the recording/reproducing apparatus 13 (FIG. 4). Also note that the external device as illustrated in FIG. 1 corresponds to the portable player 14.

The present invention can be widely used in various devices, such as a personal computer, audio components, and the like, that record content data (e.g., video data, audio data, etc.) and transfer the recorded content data to an external device (e.g., a portable player).

It should be understood by those skilled in the art that various modifications, combinations, sub-combinations and alterations may occur depending on design requirements and other factors insofar as they are within the scope of the appended claims or the equivalents thereof.

What is claimed is:

1. A non-transitory computer-readable medium including computer-readable instructions thereon, the computer-readable instructions, when executed by a processor of an apparatus, cause the apparatus to perform a method comprising:

generating programming information for programming the apparatus to download first content from a server external to the apparatus through a network, the programming information indicating that downloading of contents is to be started at a set time;

downloading the first content in accordance with the programming information, the downloading of the first content being started upon detection that the set time indicated in the programming information has come;

automatically transferring the first content from the apparatus to a device that remains external to the apparatus; and downloading second content from the server, upon completion of the downloading of the first content, and concurrently with the transfer of the first content to the device.

2. The non-transitory computer-readable medium according to claim 1, further comprising:

causing the apparatus to perform, prior to said automatically transferring step, detection of whether or not the device external to the apparatus is communicatively connected to the apparatus.

3. The non-transitory computer-readable medium according to claim 1, wherein:

the programming information generated in said programming information generating step is information that indicates that an acquisition request for an update to the first content is to be repeatedly transmitted to the server at predetermined intervals, the computer-readable medium further causes the apparatus to perform, between said programming information generating step and said downloading step, repeated transmission of the acquisition request for the update to the first content to the server at predetermined intervals in accordance with the programming information, and in said downloading step, in response to an update of the first content at the server, downloading the updated first content, which is transmitted from the server in accordance with the acquisition request.

4. The non-transitory computer-readable medium according to claim 1, wherein downloading of the second content is started immediately upon completion of the downloading of the first content.

5. The non-transitory computer-readable medium according to claim 1, wherein the first and second contents are audio files.

6. A method for an apparatus, comprising:

generating, in a processing circuit, programming information for programming the apparatus to download first content from a server external to the apparatus through a network, the programming information indicating that downloading of contents is to be started at a set time;

downloading, with the processing circuit, the first content in accordance with the programming information, the downloading of the first content being started upon detection that the set time indicated in the programming information has come;

automatically transferring, with the processing circuit, the first content from the apparatus to a device that remains external to the apparatus; and downloading, with the processing circuit, second content from the server, upon completion of the downloading of the first content, and concurrently with the transfer of the first content to the device.

7. The method according to claim 6, further comprising:

causing the apparatus to perform, prior to said automatically transferring step, detection of whether or not the device external to the apparatus is communicatively connected to the apparatus.

8. The method according to claim 6, wherein:

the programming information generated in said programming information generating step is information that indicates that an acquisition request for an update to the first content is to be repeatedly transmitted to the server at predetermined intervals, the method further includes causing the apparatus to perform, between said programming information generating step and said downloading step, repeated transmission of the acquisition request for the update to the first content to the server at predetermined time intervals in accordance with the programming information, and in said downloading step, in response to an update of the first content at the server, downloading the updated first content, which is transferred from the server in accordance with the acquisition request.

9. The method according to claim 6, wherein downloading of the second content is started immediately upon completion of the downloading of the first content.

10. The method according to claim 6, wherein the first and second contents are audio files.

11. An apparatus comprising:

circuitry configured to generate programming information for programming the apparatus to download first content from a server external to the apparatus through a network, the programming information indicating that downloading of contents is to be started at a set time, download the first content in accordance with the programming information, the downloading of the first content being started upon detection that the set time indicated in the programming information has come, automatically transfer the first content from the apparatus to a device that remains external to the apparatus, and download second content from the server, upon completion of the downloading of the first content, and concurrently with the transfer of the first content to the device.

12. The apparatus according to claim 11, wherein the circuitry is further configured to cause the apparatus to perform, prior to said automatically transferring step, detection of whether or not the device external to the apparatus is communicatively connected to the apparatus.

13. The apparatus according to claim 11, wherein:

the programming information generated is information that indicates that an acquisition request for an update to the first content is to be repeatedly transmitted to the server at predetermined intervals, and the circuitry is further configured to cause the apparatus to perform, after generation of said programming information generating and before downloading the first content, repeated transmission of the acquisition request for the update to the first content to the server at predetermined time intervals in accordance with the programming information, and in response to an update of the first content at the server, download the updated first content, which is transferred from the server in accordance with the acquisition request.

14. The apparatus according to claim 11, wherein the circuitry starts downloading the second content immediately upon completion of the downloading of the first content.

15. The apparatus according to claim 11, wherein the first and second contents are audio files.

* * * * *